US011693948B2

(12) United States Patent
Olson et al.

(10) Patent No.: US 11,693,948 B2
(45) Date of Patent: Jul. 4, 2023

(54) VERIFIABLE LABELS FOR MANDATORY ACCESS CONTROL

(71) Applicant: International Business Machines Corporation, Armonk, NY (US)

(72) Inventors: Timothy Olson, Port Orchard, WA (US); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 16/984,239

(22) Filed: Aug. 4, 2020

(65) Prior Publication Data
US 2022/0043902 A1 Feb. 10, 2022

(51) Int. Cl.
*G06F 21/45* (2013.01)
*H04L 9/30* (2006.01)

(52) U.S. Cl.
CPC ............... *G06F 21/45* (2013.01); *H04L 9/30* (2013.01)

(58) Field of Classification Search
CPC .................................. G06F 21/45; H04L 9/30
See application file for complete search history.

(56) References Cited

U.S. PATENT DOCUMENTS

| 9,749,140 | B2 | 8/2017 | Oberhauser et al. |
| 10,210,343 | B2 | 2/2019 | Lacey |
| 2003/0196108 | A1* | 10/2003 | Kung .................. H04L 9/3268 713/175 |
| 2004/0250113 | A1* | 12/2004 | Beck ................... G06F 21/6218 726/27 |
| 2007/0113266 | A1* | 5/2007 | Ross ...................... G06F 21/10 726/1 |
| 2013/0036448 | A1* | 2/2013 | Aciicmez ............ G06F 21/6218 726/1 |

(Continued)

FOREIGN PATENT DOCUMENTS

| CN | 105701372 B | 4/2019 |
| CN | 109714173 A | 5/2019 |

(Continued)

OTHER PUBLICATIONS

Valentin Gerard, "Designing the future identity: authentication and authorization through self-sovereign identity" Delft University of Technology, Aug. 2019 (Year: 2019).*

(Continued)

*Primary Examiner* — Shanto Abedin
*Assistant Examiner* — Alan L Kong
(74) *Attorney, Agent, or Firm* — Grant Johnson

(57) ABSTRACT

A computer-implemented method and a computer program product for enforcing verifiable mandatory access control (MAC) labels, and a data processing system. One embodiment may comprise receiving, from an entity, a first verifiable MAC label associated with an object, receiving, from the entity, a second verifiable MAC label associated with a subject requesting to access the object, and determining whether to grant, to the subject, access to the object responsive to the request based on comparing the first verifiable MAC label associated with the object and the second verifiable MAC label associated with the subject to a verifiable MAC policy. Each of the first verifiable MAC label, the second verifiable MAC label, and the verifiable MAC policy in some embodiments may be formatted as a verifiable credential that is machine readable and digitally signed.

25 Claims, 20 Drawing Sheets

(56) References Cited

U.S. PATENT DOCUMENTS

| | | | | |
|---|---|---|---|---|
| 2013/0139244 | A1* | 5/2013 | Blaich | G06F 21/629 |
| | | | | 726/11 |
| 2016/0241547 | A1 | 8/2016 | Nguyen et al. | |
| 2020/0035059 | A1 | 1/2020 | Campero et al. | |
| 2020/0036707 | A1* | 1/2020 | Callahan | H04L 67/53 |
| 2021/0320794 | A1* | 10/2021 | Auh | H04L 9/0891 |

FOREIGN PATENT DOCUMENTS

| | | |
|---|---|---|
| WO | 201832373 A1 | 2/2018 |
| WO | 201981530 A1 | 5/2019 |
| WO | 202008367 A | 1/2020 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

Flanders, "Intelligent Sampling With OpenCensus," Omnition Blog, Printed Mar. 26, 2020, 4 pages https://omnition.io/blog/intelligent-sampling-with-opencensus/.

Sporny et al., "Verifiable Credentials Data Model 1.0," Expressing verifiable information on the Web, W3C, Nov. 19, 2019, 122 pages, https://www.w3.org/TR/2019/REC-vc-data-model-20191119/.

Reed et al., "Decentralized Identifiers (DIDs) v1.0," W3C, Working Draft Mar. 23, 2020, 68 pages https://www.w3.org/TR/did-core/#terminology.

"Sampling Traces," honeycomb.io, Printed Mar. 26, 2020, 2 pages https://docs.honeycomb.io/working-with-your-data/tracing/sampling/.

Olson, "Blockchain for trusted security labels," Blockchain Pulse: IBM Blockchain, Nov. 5, 2019, 13 pages https://www.ibm.com/blogs/blockchain/2019/11/blockchain-for-trusted-security-labels/.

\* cited by examiner

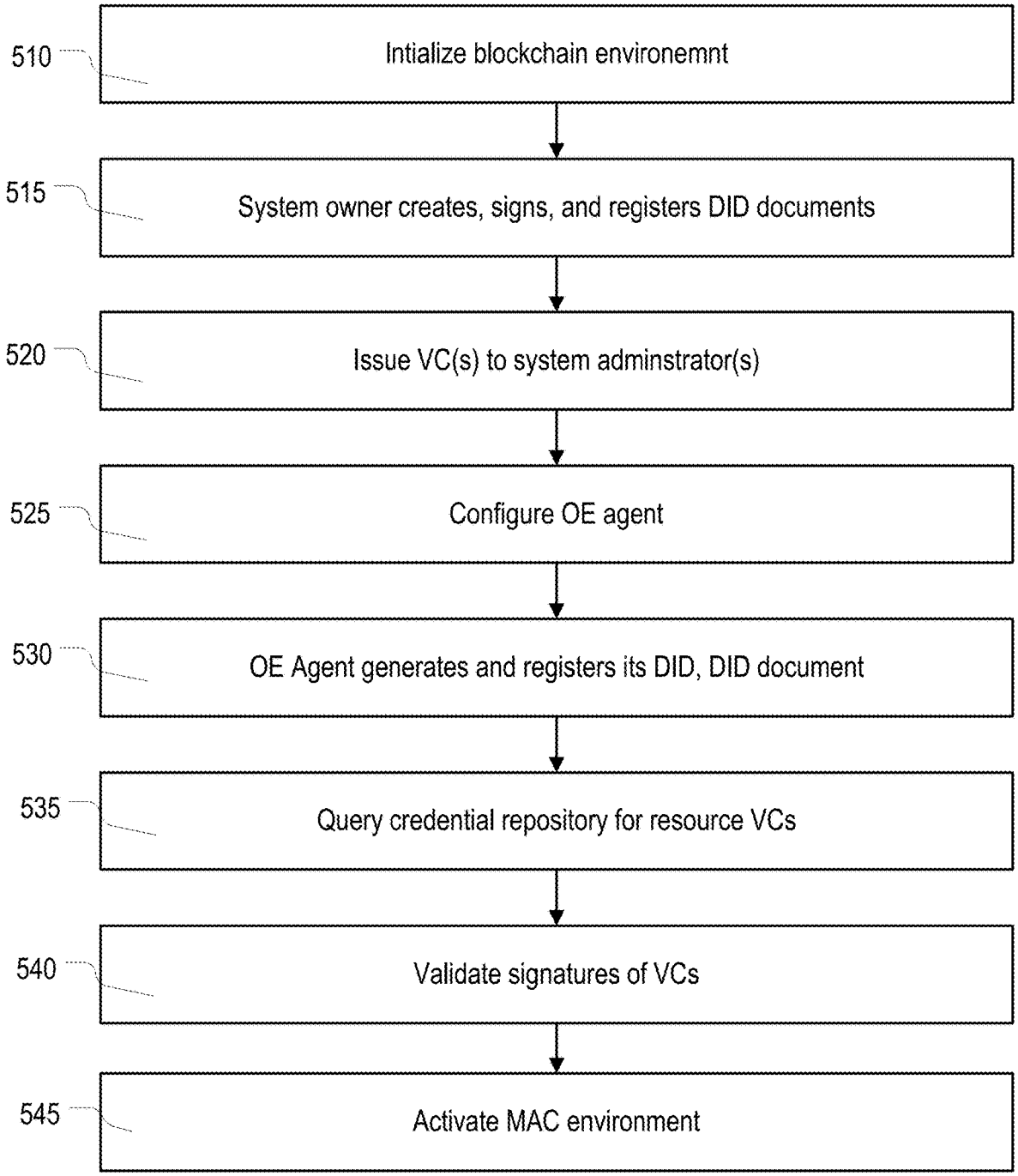

990

Block_i

Header 972_i

- Hash Value of Previous Block
- Reference Information

File(s) (and Metadata) 974_i

| Data 1 | REF 1 | Metadata 1 |
| Data 2 | REF 2 | Metadata 2 |
| . | . | . |
| . | . | . |
| . | . | . |
| Data N | REF N | Metadata N |

Value 976_i (based on one or more of)

- New Hash Value of File
- New Storage Location of File
- New Metadata Assigned to File
- Transfer Access/Control to New Blockchain Participant
- New/Existing/Change of Ownership of the File

FIG. 9D

VERIFIABLE LABELS FOR MANDATORY ACCESS CONTROL

BACKGROUND

The present disclosure relates to computer security, and more specifically, to mandatory access control (MAC) systems.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push the performance of the computer higher and higher, even more, advanced computer software has evolved to take advantage of the higher performance of the hardware, resulting in computer systems today that are much more powerful than just a few years ago.

These advanced computer systems have become essential technical tools and important parts of everyday life. Their increased power and complexity, however, has made the technical problems associated with computer security ever more difficult. One common technique for securing computer systems are access controls (ACs), which generally refers to the selective restriction of computing resources to certain users, processes, and/or threads. In AC systems, the entities that can perform actions on the system are commonly called "subjects," and the resources to which access is controlled are commonly called "objects." AC systems may be further broken down into three related operations: authentication of the subject, authorization to the object, and audit-ability of the actions.

Mandatory Access Controls (MACs) generally refer to a type of AC system in which an administrator, system root, or other authority controls the ability of a subject to access or perform an operation on an object, typically enforced using functionality built into the operating system kernel of the computer system. Under MACs, ordinary users of the computer system typically cannot change the authorization rules. Common subjects managed by MACs include a process or thread executing on the system, but can include human user subjects too. Common objects a MAC system include files, ports, I/O devices, shared memory segments, commands, and the like.

Unfortunately, effectively applying MACs has proven to be technically and practically difficult, particularly in multilevel security (MLS) systems, as the sheer number of objects and subjects, plus their potential interaction combinations, make it challenging to create and maintain the required labels and policies, as well as tend to create unacceptable performance drag. Applying MAC to modern computer distributed solutions can also be technically challenging because their physical and logical components do not work in isolation. This means that any MAC system must interact with remotely-located subjects and objects, under conditions where the trustworthiness of those external entities and externally supplied labels can be suspect.

U.S. Patent Publication number 2016/0241547A1 is directed towards processing requests for accessing a service provider. After examining at least one security token, a public key and a portion of attribute information are identified. An authentication component is accessed and applied to the public key. A unique user identifier is employed in generating the public key. The authentication component is generated using information from at least one revoked security token or at least one valid security token. The authentication component is configured to prove validity of the at least one security token.

SUMMARY

According to embodiments of the present disclosure, a computer-implemented method for enforcing verifiable mandatory access control (MAC) labels. One embodiment may comprise receiving, from an entity, a first verifiable MAC label associated with an object, receiving, from the entity, a second verifiable MAC label associated with a subject requesting to access the object, and determining whether to grant, to the subject, access to the object responsive to the request based on comparing the first verifiable MAC label associated with the object and the second verifiable MAC label associated with the subject to a verifiable MAC policy. Each of the first verifiable MAC label, the second verifiable MAC label, and the verifiable MAC policy in some embodiments may be formatted as a verifiable credential that is machine readable and digitally signed. Some embodiments may further comprise registering a decentralized identifier (DID) and a DID document associated with the entity in a distributed ledger, wherein the DID document identifies authentication mechanisms and communication endpoints relating to the entity.

According to embodiments of the present disclosure, a computer program product for enforcing verifiable mandatory access control (MAC) labels, the computer program product comprising a computer readable storage medium having program instructions embodied therewith. The program instructions may be executable by a processor to cause the processor to receive, from an entity, a first verifiable MAC label associated with an object, receive, from the entity, a second verifiable MAC label associated with a subject requesting to access the object, and determine whether to grant, to the subject, access to the object responsive to the request based on comparing the first verifiable MAC label associated with the object and the second verifiable MAC label associated with the subject to a verifiable MAC policy. Each of the first verifiable MAC label, the second verifiable MAC label, and the verifiable MAC policy in some embodiments may be formatted as a verifiable credential that is machine readable and digitally signed. Some embodiments may further comprise program instructions to register a decentralized identifier (DID) and DID document associated with the entity in a distributed ledger, wherein the DID document identifies authentication mechanisms and communication endpoints associated with the entity.

According to embodiments of the present disclosure, a data processing system, comprising a processor coupled to a memory, and an operating environment (OE) agent for the data processing system. The OE agent in some embodiments may be configured to enforce verifiable mandatory access control (MAC) labels, including receiving, from an entity, a first verifiable MAC label associated with an object, receiving, from the entity, a second verifiable MAC label associated with a subject, receiving, from the subject, a request to access the object, and determining whether to grant, to the subject, access to the object responsive to the request based on comparing the first verifiable MAC label associated with the object and the second verifiable MAC label associated with the subject to a verifiable MAC policy. Each of the first verifiable MAC label, the second verifiable MAC label, and the verifiable MAC policy in some embodiments may be formatted as a verifiable credential that is machine readable and digitally signed. The OE agent in some embodiments may be further configured to register a decentralized identifier (DID) and DID document associated in a distributed ledger, wherein the DID document identifies an authentication mechanism, a communication endpoint, and a controller associated with the entity.

According to embodiments of the present disclosure, a computer-implemented method for operating a verifiable mandatory access control (MAC) system. One embodiment may comprise defining labels for resources in a data processing system, issuing verifiable credentials for the labels, storing the verifiable credentials in a wallet on the data processing system, registering a schema of the verifiable credentials in a distributed ledger, periodically receiving new verifiable credentials from a credential repository, validating the new verifiable credentials, and storing the new validated credentials in the wallet. The verified credentials and the new verified credentials in some embodiments may be machine readable and digitally signed. Some embodiments may further comprise receiving, from a subject, a request to access an object, retrieving, from the wallet, a first verifiable MAC label associated with the object, retrieving, from the wallet, a second verifiable MAC label associated with the subject, and determining whether to grant, to the subject, access to the object responsive to the request based on comparing the first verifiable MAC label associated with the object and a second verifiable MAC label associated with the subject to a verifiable MAC policy.

According to embodiments of the present disclosure, a mandatory access control system, comprising a peer node associated with a blockchain network, the blockchain network comprising a plurality of nodes, the peer node adapted to record a plurality of decentralized identifiers for a mandatory access control system. The peer node in some embodiments may be further adapted to register a decentralized identifier (DID) and DID document associated with an entity in a distributed ledger, wherein the DID document identifies authentication mechanisms and communication endpoints associated with the entity.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 is a flow chart illustrating a MAC bootstrap process 500, consistent with some embodiments.

FIG. 9D illustrates a block which may represent the structure of blocks in the blockchain, according to example embodiments.

Figure 1:
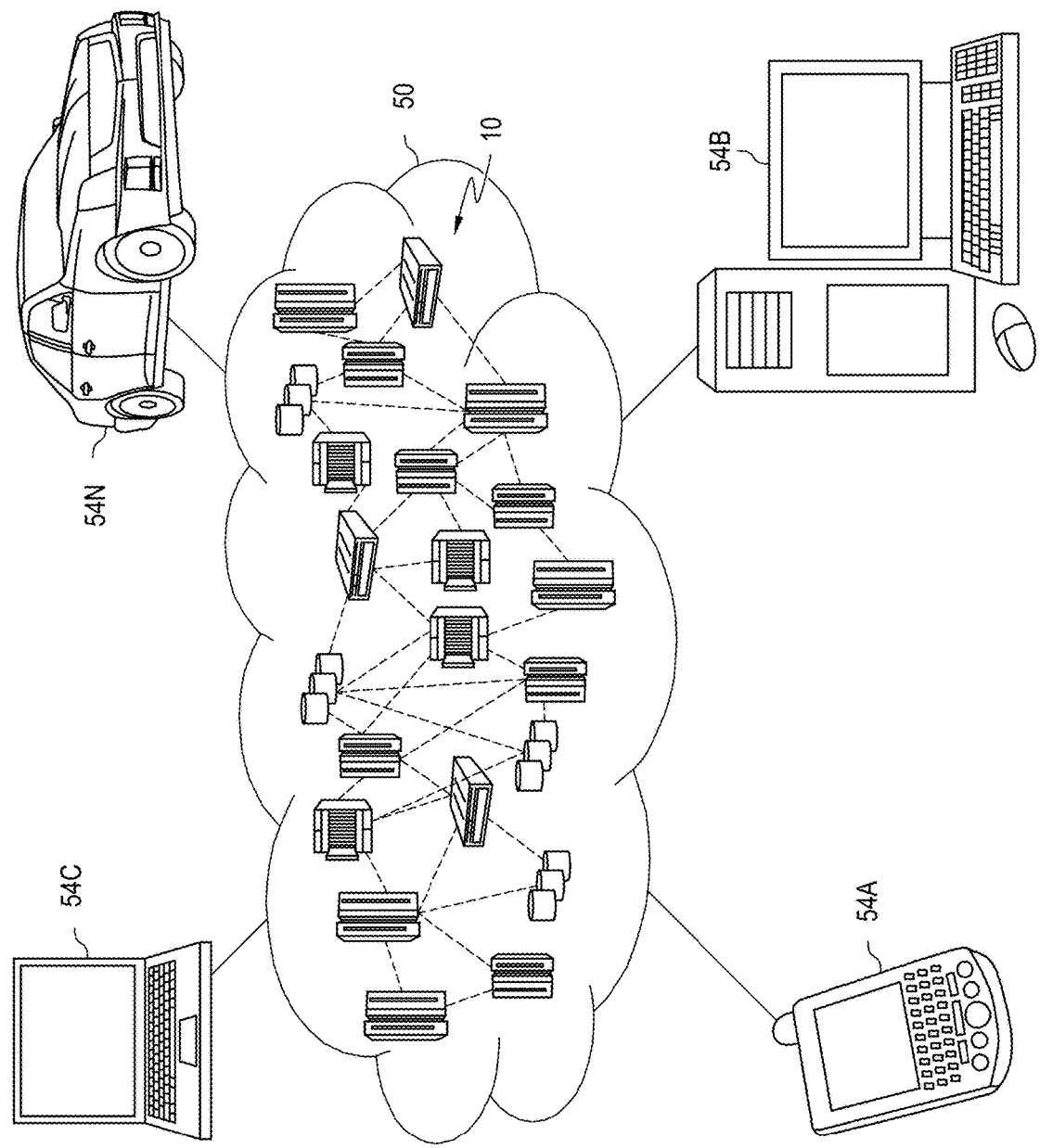
FIG. 1 depicts a cloud computing environment, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security, more particular aspects relate to mandatory access control (MAC) systems. While the present disclosure is not necessarily limited to such applications, various aspects of the disclosure may be appreciated through a discussion of various examples using this context.

Some embodiments of this disclosure provide for verifiable credentials (VCs) as trusted Mandatory Access Control (MAC) security labels—henceforth referred to as Verifiable Labels (VL). The VLs may include globally unique Decentralized Identifiers (DIDs) based on Uniform Resource Identifiers (URI) that are both resolvable and verifiable. A DID may resolve to its "DID document," which may identify the subject's authentication mechanisms (including public keys, digital certificates (i.e., public key certificates), such as x509 certificates, etc.) and communication endpoints.

The verifiable labels (VLs) in some embodiments may extend the World Wide Web Consortium (W3C) DID specification, and may provide a tamper-evident and verifiable set of claims made by an issuer about a subject(s) and may be held by the subject or non-subject. VLs may be presented to a verifier function for access/authorization decisions. Some embodiments may also provide for a software process ("Software agent function") acting on behalf of an entity to interact with an ID ledger or other agents. Software agent functions, in turn, may use a wallet to hold private keys and credentials, and may perform cryptographic operations.

Some embodiments of this disclosure may further utilize distributed ledger technology (DLT) to maintain the ID ledger and/or to assure the validity of VLs. In these embodiments, a subject's DID may be registered with a DLT, such as blockchain, or with another form of decentralized network.

Some embodiments may be desirable because they provide for improved management of security labels, which in turn, may reduce security administrator workload. For example, embodiments that support self-service identity and decentralized credential issuance may eliminate the need for third-party Certificate Authorities. Similarly, self-service identity and decentralized VL issuance may help to ensure labels and rules are correct and properly applied and maintained. That is, because a VL may be issued and digitally signed by the subject or resource owner rather than traditional labels which are merely unsigned, unaccountable system-level attributes assigned by system security administrators.

Some embodiments may be desirable because they provide for an extended root-of-trust for security labels by using DLTs within and across organization boundaries. This end-to-end label provenance may additionally allow for improved audit-ability, oversight, and governance, for example, by cryptographically identifying credential issuers, holders, and verifiers, as well as documenting policies and policy changes.

Another feature and advantage of some embodiments is that they may provide for more flexible policies and labels. For example, security labels may not be limited to an association with a hierarchical security level, with zero or more non-hierarchical associated categories. Instead, some embodiments may support multi-attribute, credential-based access policies.

Cloud Computing

FIG. 1 illustrates a cloud environment, consistent with some embodiments. It is to be understood that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active customer accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited customer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
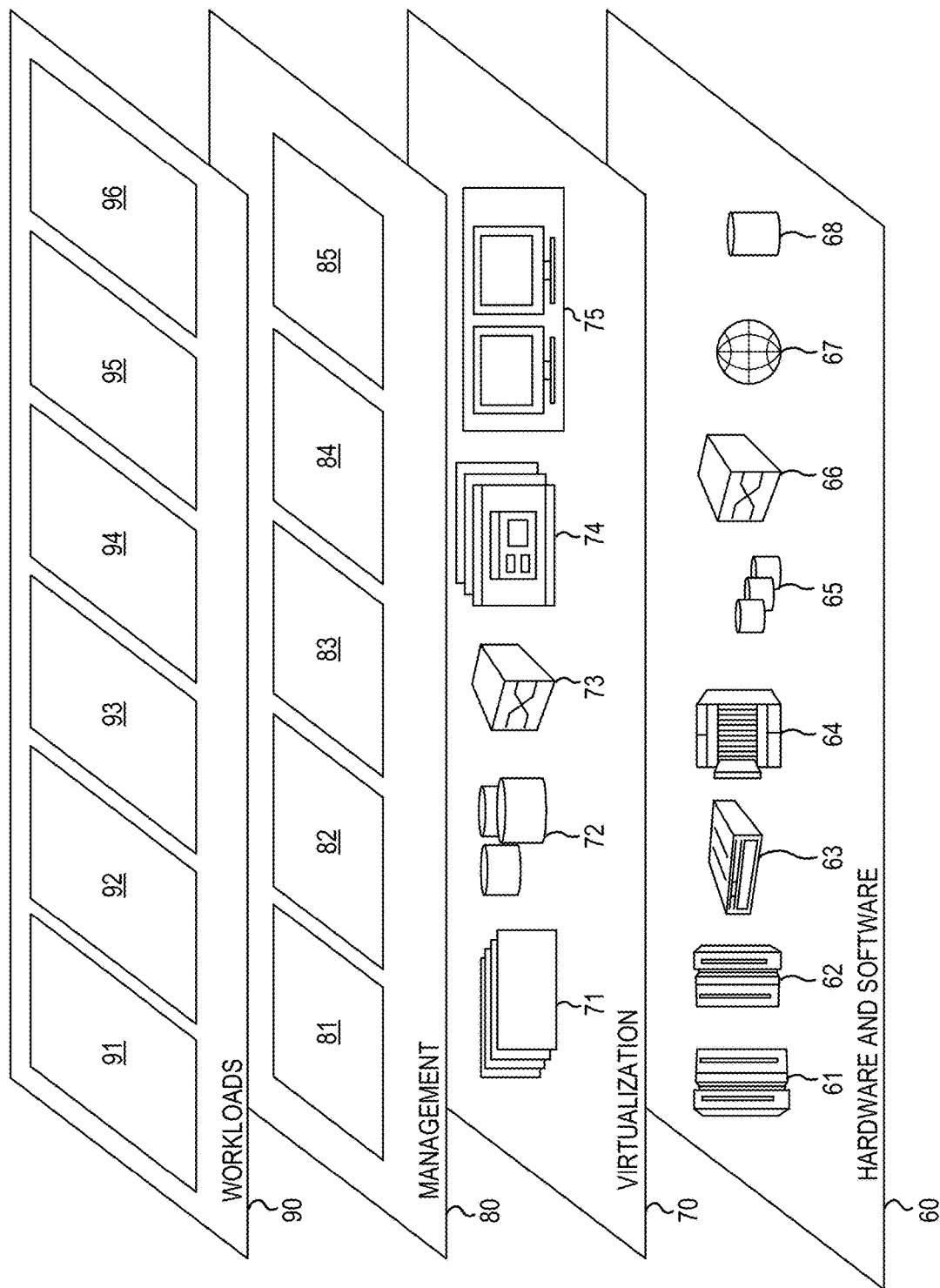
FIG. 2 depicts abstraction model layers, consistent with some embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only, and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. Customer portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; and data analytics processing 94; transaction processing 95; and MAC administrative interface 96.

Data Processing System

Figure 3:
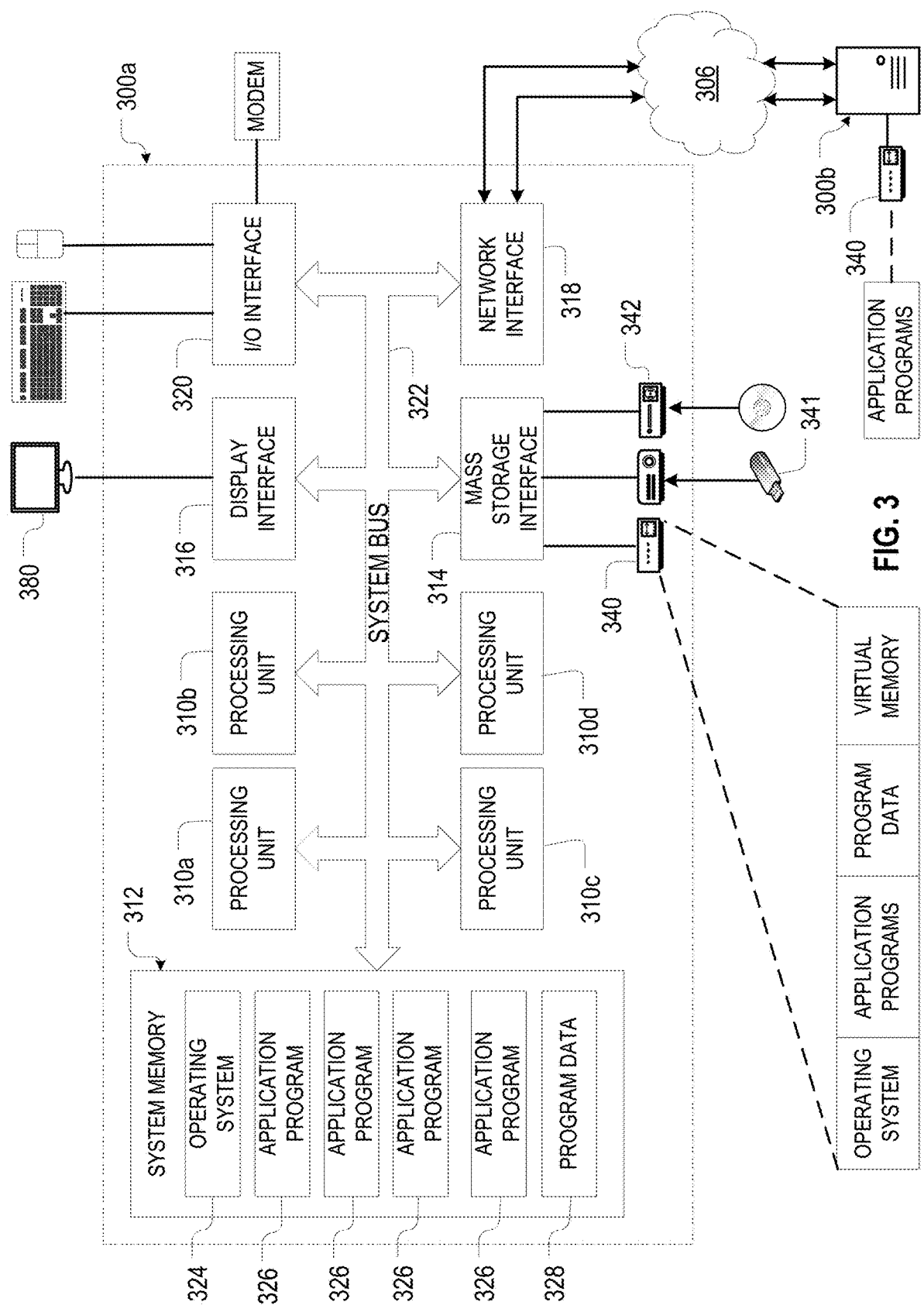
FIG. 3 depicts a data processing system, consistent with some embodiments.

FIG. 3 illustrates an embodiment of a data processing system (DPS) 300a suitable for use as a cloud computing node 10 in a cloud computing environment 50, as a MAC enabled computer system, and/or as a blockchain node, consistent with some embodiments. In some embodiments, the DPS 300a may be implemented as a personal computer; server computer; portable computer (e.g., a laptop, notebook computer, a Personal Digital Assistant ("PDA"), tablet computer, smartphone, etc.); processors embedded into larger devices (e.g., an automobile, airplane, teleconferencing system, appliance, etc.); smart devices; or any other appropriate type of electronic device. Moreover, components other than or in addition to those shown in FIG. 3 may be present, and that the number, type, and configuration of such components may vary. Moreover, FIG. 3 only depicts the representative major components of the DPS 300a, and individual components may have greater complexity than represented in FIG. 3.

The data processing system 300a embodiment in FIG. 3 may comprise a plurality of central processing units 310a-310d (herein generically referred to as a processor 310 or a CPU 310) connected to a memory 312, a mass storage interface 314, a terminal/display interface 316, a network interface 318, and an input/output ("I/O") interface 320 by a system bus 322. The mass storage interface 314 may connect the system bus 322 to one or more mass storage devices, such as a direct access storage device 340, universal serial bus ("USB") storage device 341, or a readable/writable optical disk drive 342. The network interfaces 318 may allow the DPS 300a to communicate with other DPS 300b over the communications medium 306. The memory 312 also contains an operating system 324, a plurality of application programs 326, and program data 328.

The data processing system 300a embodiment in FIG. 3 is a general-purpose computing device. Accordingly, the processors 310 may be any device capable of executing program instructions stored in the memory 312, and may themselves be constructed from one or more microprocessors and/or integrated circuits. In this embodiment, the DPS 300a contains multiple processors and/or processing cores, as is typical of larger, more capable computer systems; however, in other embodiments, the DPS 300a may comprise a single processor system and/or a single processor designed to emulate a multiprocessor system. Further, the processors 310 may be implemented using a number of heterogeneous DPS 300a in which the main processor is present with secondary processors on a single chip. As another illustrative example, the processor 310 may be a symmetric multiprocessor system containing multiple processors of the same type.

When the DPS 300a starts up, the associated processor(s) 310 may initially execute the program instructions that make up the operating system 324, which manages the physical and logical resources of the DPS 300a. These resources may include the memory 312, the mass storage interface 314, the terminal/display interface 316, the network interface 318, and the system bus 322. As with the processor(s) 310, some DPS 300a embodiments may utilize multiple system interfaces 314, 316, 318, 320, and busses 322, which in turn, may each include their own separate, fully programmed microprocessors.

Instructions for the operating system, applications and/or programs (generically referred to as "program code," "computer usable program code," or "computer-readable program code") may be initially located in the mass storage devices 340, 341, 342, which are in communication with the processors 310 through the system bus 322. The program code in the different embodiments may be embodied on different physical or tangible computer-readable media, such as the system memory 312 or the mass storage devices 340, 341, 342. In the illustrative example in FIG. 3, the instructions are stored in a functional form of persistent storage on the direct access storage device 340. These instructions are then loaded into the memory 312 for execution by the processor 310. However, the program code may also be located in a functional form on the selectively removable computer-readable media 342 and may be loaded onto or transferred to the DPS 300a for execution by the processor 310.

The system bus 322 may be any device that facilitates communication between and among the processors 310; the memory 312; and the interfaces 314, 316, 318, 320. Moreover, although the system bus 322 in this embodiment is a relatively simple, single bus structure that provides a direct communication path among the system bus 322, other bus structures are consistent with the present disclosure, including without limitation, point-to-point links in hierarchical, star or web configurations, multiple hierarchical buses, parallel and redundant paths, etc.

The memory 312 and the mass storage devices 340, 341, 342 may work cooperatively to store the operating system 324, the application programs 326, and the program data 328. In this embodiment, the memory 312 is a random-access semiconductor device capable of storing data and programs. Although FIG. 3 conceptually depicts that device as a single monolithic entity, the memory 312 in some embodiments may be a more complex arrangement, such as a hierarchy of caches and other memory devices. For example, the memory 312 may exist in multiple levels of caches, and these caches may be further divided by function so that one cache holds instructions while another holds non-instruction data that is used by the processor or processors. Memory 312 may be further distributed and associated with different processors 310 or sets of processors 310, as is known in any of various so-called non-uniform memory access (NUMA) computer architectures. Moreover, some embodiments may utilize virtual addressing mechanisms that allow the DPS 300a to behave as if it has access to a large, single storage entity instead of multiple, smaller storage entities.

Although the operating system 324, the application programs 326, and the program data 328 are illustrated as being contained within the memory 312, some or all of them may be physically located on different DPS 300b and may be accessed remotely, e.g., via the communications medium 306, in some embodiments. Thus, while the operating system 324, the application programs 326, and the program data 328 are illustrated as being contained within the memory 312, these elements are not necessarily all completely contained in the same physical device at the same time, and may even reside in the virtual memory of other DPS 300b.

The system interfaces 314, 316, 318, 320 support communication with a variety of storage and I/O devices. The mass storage interface 314 supports the attachment of one or more mass storage devices 340, 341, 342, which may be rotating magnetic disk drive storage devices; a solid-state storage device (SSD) that uses integrated circuit assemblies as memory to store data persistently, typically using flash memory; or a combination of the two. Moreover, the mass storage devices 340, 341, 342 may also comprise other devices, including arrays of disk drives configured to appear as a single large storage device to a host (commonly called RAID arrays) and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like.

The terminal/display interface 316 may be used to directly connect one or more display units 380 to the DPS 300a. These display units 380 may be non-intelligent (i.e., dumb) terminals, such as an LED monitor, or may themselves be fully programmable workstations used to allow IT administrators and customers to communicate with the DPS 300a. Note, however, that while the display interface 316 is provided to support communication with one or more display units 380, the DPS 300a does not necessarily require a display unit 380 because all needed interaction with customers and other processes may occur via network interface 318.

The communications medium 306 may be any suitable network or combination of networks and may support any appropriate protocol suitable for communication of data and/or code to/from multiple DPS 300a. Accordingly, the network interfaces 318 can be any device that facilitates such communication, regardless of whether the network connection is made using present-day analog and/or digital techniques or via some networking mechanism of the future. Suitable communication media 306 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols can be used to implement the communications medium 306. The Transmission Control Protocol/Internet Protocol ("TCP/IP") suite contains suitable network and transport protocols.

MAC Orchestration System

Figure 4:
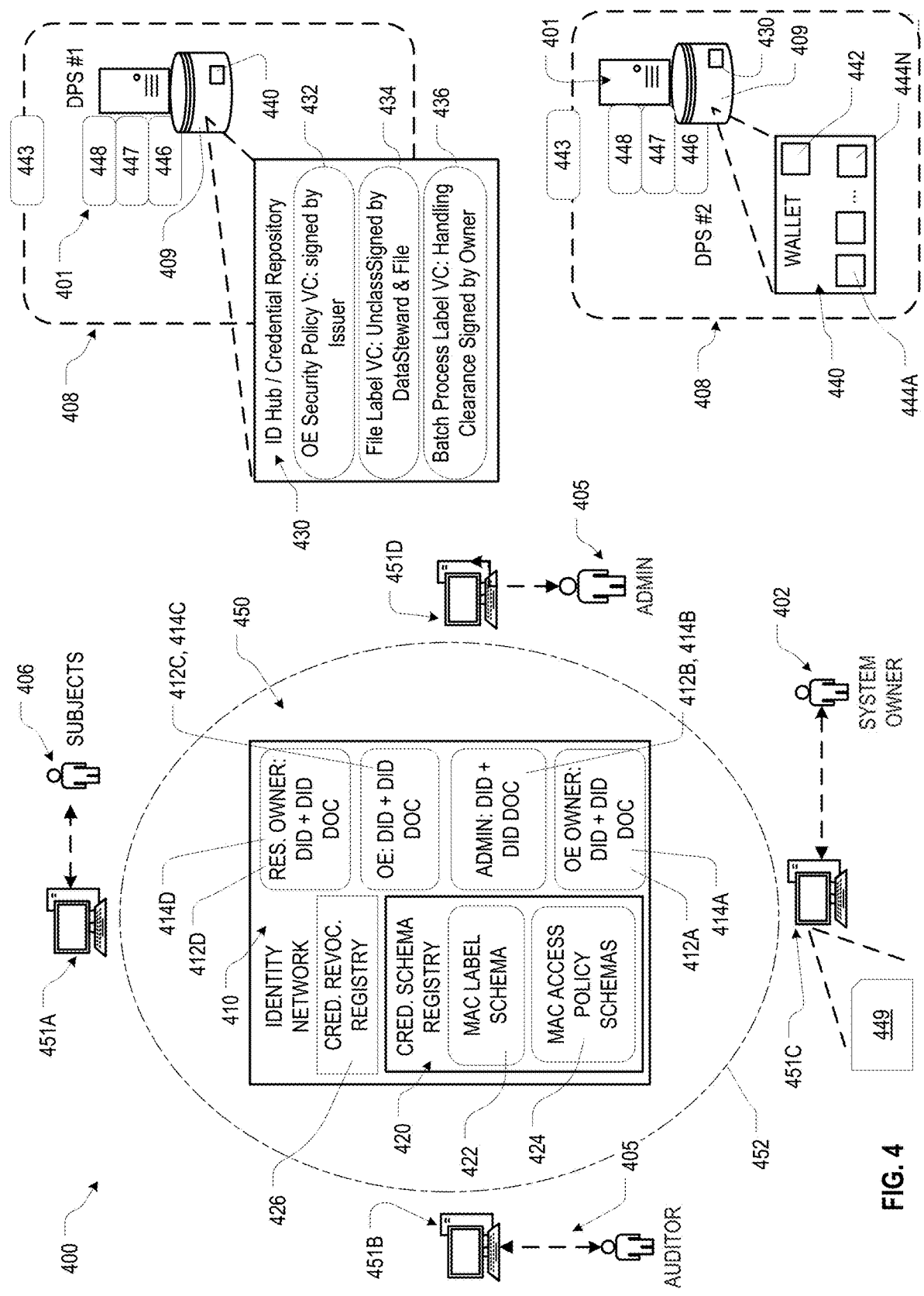
FIG. 4 is a schematic diagram of a MAC orchestration system, consistent with some embodiments.

FIG. 4 is a schematic diagram of a MAC orchestration system 400, consistent with some embodiments. This MAC orchestration system 400 is described with reference to a plurality of operating environments 401 ("OEs"), such as a DPS 300a having associated system resources 409 to be controlled as MAC objects, a system owner component 402 ("owners"), an auditor component 404, one or more subjects 406 (e.g., a user or process), a system administrator 405 ("system admin") component, and a resource owner/steward component 408. The resource owner/steward component 408 in some embodiments may be a user or a process creating, issuing, and/or maintaining the verified labels for the resources 409 for which they are responsible (e.g. the file and the batch process). The resource owner/steward 408 may create/digitally sign a verified label and issue it to an ID Hub/Credential repo 430, which holds the verified label until the OE puts it in its wallet 440.

The MAC orchestration system 400 in FIG. 4 may include an identity network 410. Entities within the MAC orchestration system 400 that will be issuing verified credentials (e.g., the OE(s) 401, the system owners 402, the system admins 405, and the resource owners/stewards 408) may register their DIDs 412A-412D and DID documents 414A-414D with the identity network 410. The DID document(s) 414A-414D, in turn, may contain the associated entity's 401, 402, 404, 406 preferred authentication mechanisms and service endpoints. The identity network 410 may publish digitally signed credential schemas, such as a MAC label schema 422 and a MAC access policy schema 424, to be held in a ledger credential schema registry 420. The identity network 410 may also include a credential revocation registry 426 that identifies revoked credentials.

The MAC orchestration system 400 embodiment in FIG. 4A may also include a plurality of identity hubs/credential repositories 430 ("ID hub"). These ID hubs 430 may act as OE 401 accessible service endpoints to securely store and share signed VLs. The ID hub(s) 430 may include various subject and resource VLs, e.g. a file label VC 434, and a batch process label VC 436, and OE security policy verified credential ("VC") 432.

Each operating environment 401 within the MAC orchestration system 400 in FIG. 4 may include an OE credential wallet 440 (only one depicted for clarity) that securely stores one or more private keys 442 and local copies of a plurality of verified credentials 444A-444N (collectively VCs 444) from ID hub(s) (430). A private key or set of keys 442 for each OE 401 may also be generated and stored within the OE wallet 440, and typically remain in the OE wallet 440 (i.e., the private key(s) typically need not be transferred from the OE wallet 440 when implementing embodiments of the disclosure).

The VCs 444 in this embodiment may assert system subject and resource attributes (i.e., verifiable labels) for subjects and resources under the control of the OE 401 and/or may assert access policies for those resources, which may be expressed in the form of the required attributes and values required for access. These VCs 444 may be issued and/or attested by a resource owner/steward component 408, such as the process/thread that created the resource or by the system owner 402. The VCs 444 may be desirable because they provide credential-based attributes used for enforcing mandatory access control to the system resources (i.e. they act as verifiable labels (VL)).

Each operating environment 401 may further include an OE policy enforcement point agent 446 ("OE agent"). The OE agent 446 may be a trusted process executing on the OE 401 that acts as agent on behalf of the OE 401, and that enforces authentication and authorization policies to access the OE-controlled system resources 409. In some embodiments, the OE agent 446 may perform all the key management and cryptographic operations on behalf of the OE 401 (e.g., digital signing, signature validation, encryption, etc.) and may be authorized to read/write to the associated OE wallet 440. Additionally, the OE agent 446 may interact with subjects 406 for additional authentication and/or authorization, may interact via the MAC verifiable label resolver ("resolver") 447 with the identity network 410 to retrieve DID Documents 414A-414N to validate/authenticate the associated signatures. In some embodiments, this may include interacting with the MAC verifiable label decision service ("decision service") 448. In some embodiments, this may further include interacting with the OE's controller 443 (i.e., the organization or person entity responsible for the non-person OE entity's digital identity, and specifically, controls its private keys 442). In some embodiments, the OE controller 443 may be identified via an attribute in the OE's DID Document (e.g., the DID of the system admin 405 or system owner 402, identifying that system admin 405 is able to make changes to the OE's DID document.

The ledger credential schema registry 420 and the credential revocation registry 426 may be stored on one or more distributed ledgers 449 on a blockchain 450. The blockchain 450, in turn, may comprise a network of data processing systems or "nodes" 451A-451D (collectively nodes 451), such as DPS 300a, and may be located in different logical (e.g., data owning organizations vs. data hosting organizations, etc.) and physical (e.g., different states or countries) locations. The nodes 451 may be connected to each other via encrypted network communication channels 452. In some embodiments, nodes 451 may be added to the blockchain 450 if, and only if, they have been approved to do so by the other preexisting nodes 451 in the blockchain 450 according to a consensus protocol.

Each node 451 in some embodiments may maintain a copy of the distributed ledger 449 (only one copy depicted in FIG. 4 for clarity) that lists all the accepted transactions submitted to the distributed ledger 449. A transaction in this embodiment may be accepted if, and only if, there is an agreement between the nodes 451 according to the consensus protocol. A transaction can only be added to the distributed ledger 449 in this embodiment, as all past transactions in the distributed ledger 449 are immutable and cannot be changed. Moreover, the distributed ledger 449 may be cryptographically signed to ensure tampering with the records is practically impossible.

In some embodiments, the nodes 451 may execute smart contracts (i.e., computer programs submitted by operating environments 401 that process transactions in the blockchain 450, such as to digitally facilitate, verify, or enforce performance of the transaction). The duties of these programs may include, without limitation, one or more of: (i) validating transactions, i.e., participating in the consensus protocol that accepts new transaction in the ledger 449; (ii) proposing new transactions to the distributed ledger 449, which may or may not be accepted; and (iii) performing actions with external clients to process one or more transactions. A smart contract may be executed in parallel on all nodes 451 of the blockchain 450, and the result of the smart contract may only be accepted by the blockchain 450 if, and only if, there is an agreement between the nodes 451 in the blockchain 450 according to a consensus protocol.

In some embodiments, the blockchain 450 may be a permissioned blockchain. In these embodiments, OEs 401 may only connect to the blockchain 450 via nodes 451, which authenticates and authorizes them. OEs 401 in these embodiments may invoke a blockchain network API to submit transactions, query transaction states, and attributes, etc. These transactions may include, without limitation, one or more of: (i) nodes 451 proposing new transactions to be added to the ledger 449 that then go through the consensus protocol to have them accepted by the distributed ledger 449; (ii) nodes 451 checking for new transactions accepted by the distributed ledger 449 that they are authorized to process; and (iii) nodes 451 submitting smart contracts to the distributed ledger 449.

The identity network blockchain (449) access management system, in some embodiments, may be implemented by using the blockchain 450 to enable associating identities to the entities that have granted access rights to connect/call services provided by the blockchain 450. These entities may have rights to connect to an existing node 451 or to add an additional node (not shown) to which they can connect. These entities may also have the rights to submit and interact with smart contracts from the node 451 to which they are connected. The entities, and the smart contracts they submit, may have the rights to get/submit transactions that have attributes that match the access policy criteria.

MAC Bootstrap

FIG. 5 is a flow chart illustrating a verifiable label (VL) MAC bootstrap process 500, consistent with some embodiments. This bootstrap process 500 may be used in some embodiments of this disclosure to initialize and/or start execution of the MAC orchestration system 400. At operation 510, the identity network (450) is initialized with the identities of the participating entities. This may include creating private/public key pairs by the major participating entities (system owner component 402, system administration component 405) in the system 400, and registering their identity on the identity network (450) by creating and populating their DID documents 414, including their public key. With digital identities in place and registered on the identity network (410), entities may issue schema-conformant VC(s) asserting any required attributes of the participants and VL(s) asserting subject and resource attributes. For example, at operation 520, system owners 402 issue VC(s) to system administrators(s) 405 asserting a system admin role 405 and a controller role for the OE (443).

At operation 525, the OE controller (405, 443) may configure/activate an OE agent 446 for each OE 401. This may include specifying the DID 412 for the system owner 402, the DID(s) for the system administrators(s) (405) and the OE's controllers (443), and DID's for resource owner(s). This may further include specifying service endpoint(s) for credential repositories (430) and for the OE 401 itself. Next, at operation 530, the OE agent 446 generates its DID 412 and its OE private key, stores its private key in the OE wallet (440), populates the associated DID document 414, and registers the DID document 414 in the distributed ledger 449 identity network.

The OE Agent 446 may then securely query the credential repository for system resource VL (labels) at operation 535. Next, the OE agent 446 may validate the signatures of all new VLs and stores/caches in the OE wallet at operation 540. This may include resolving issuer DIDs 412 to DID documents 414, obtaining public keys, and validating signatures. The system administrator 405 may then activate MAC at operation 545. Labels may now be required for access to system resources 409.

Figure 6A:
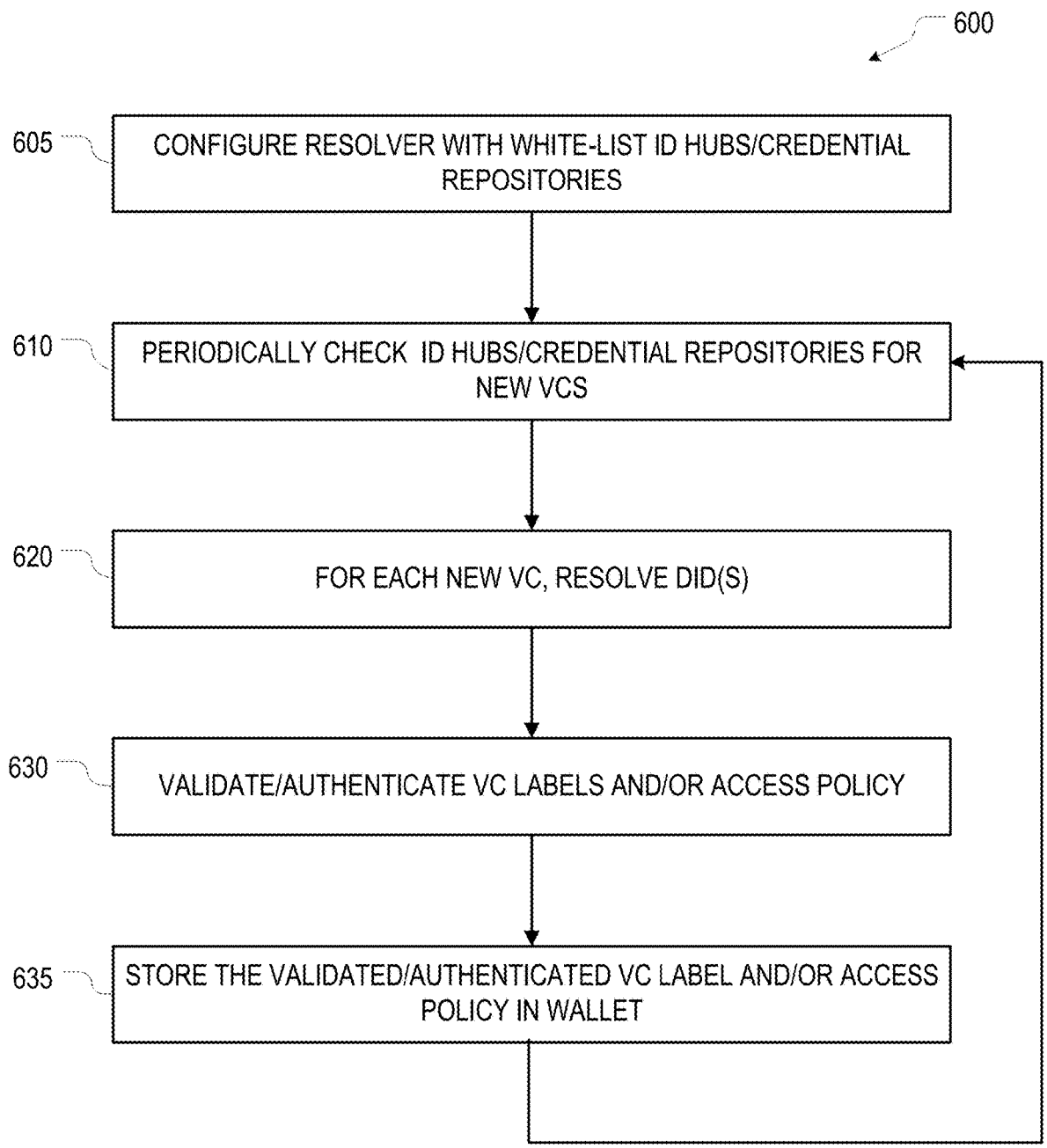
FIG. 6A is a flow chart showing one method of operation of a MAC verifiable label resolver, consistent with some embodiments.

MAC Verifiable Label Resolver:

FIG. 6A is a flow chart showing one method 600 of operation of a MAC verifiable label resolver 447, consistent with some embodiments. The method 600 begins at operation 605, where the resolver 447 may be configured by the system administrator 405 with whitelisted (i.e., a list considered to be acceptable or trustworthy) ID hub 430 service endpoints. This information may be configured via the OE agent's DID document 414. Next, at operation 610, the OE agent 446 periodically checks the ID hubs 430, including the revocation registry 426, for revoked/updated/new system resource VLs (i.e., labels) and caches validated VLs in the wallet 440. Additionally or alternatively, the OE agent 446 may subscribe to authorized ID hubs 430 messages to receive new VL and MAC Access Policies.

Figure 6B:
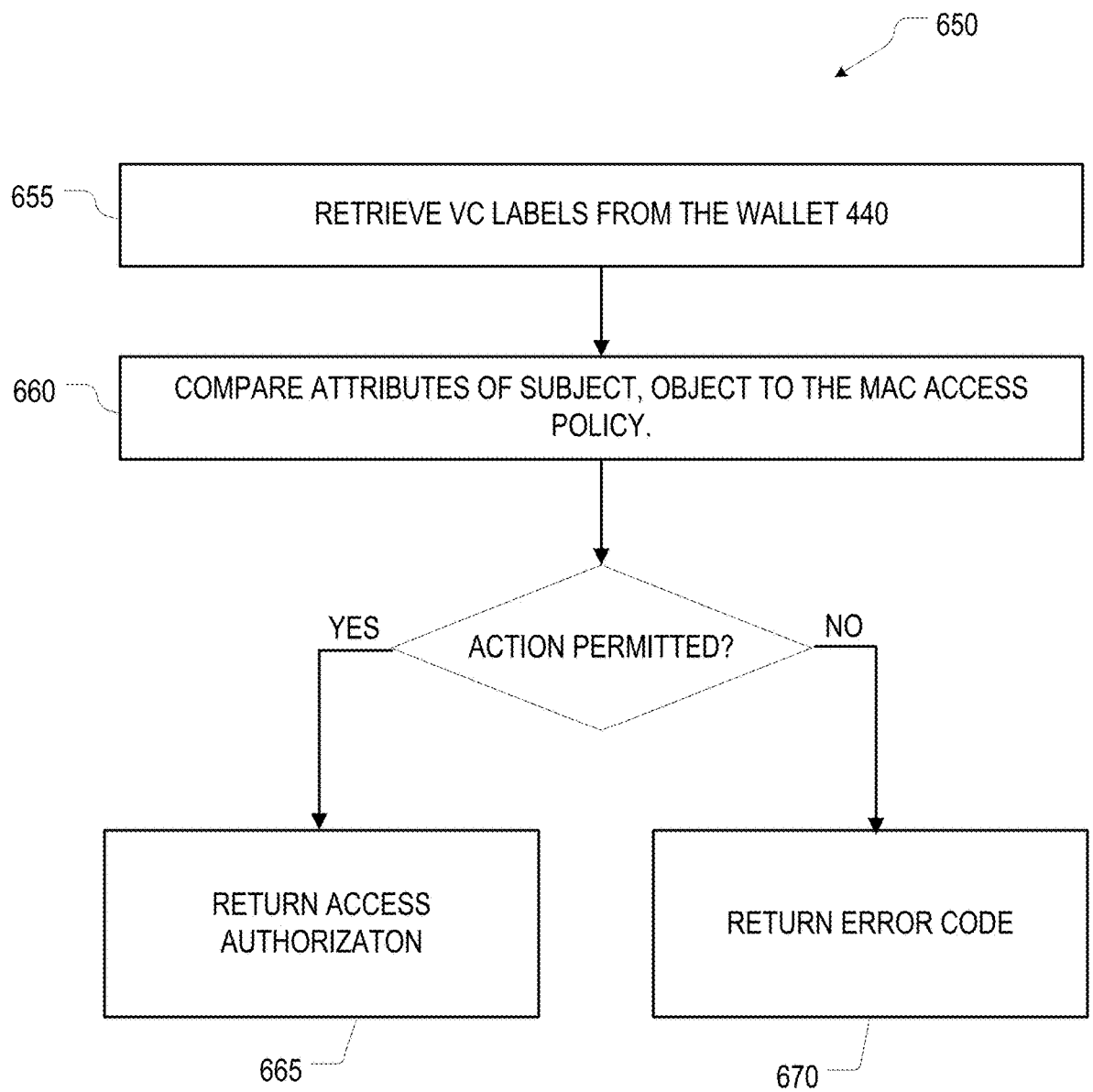
FIG. 6B is a flow chart showing one method of operation for a MAC verifiable label decision service, consistent with some embodiments.

For each newly discovered VL and access policy, the resolver 447 may first resolve all DIDs 412 on the appropriate identity network(s) 410 at operation 620. The resolver 447 may then receive from the identity networks DID document(s) 414 of each DID(s) 412 at operation 625. Next, at operation 630, the resolver 447 may use the public key from one of the received DID documents 414 to validate/authenticate the VL and/or access policy. In some embodiments, this operation 630 may include using digital signature techniques for verifying the authenticity and integrity of a message. At operation 635, the resolver may store the validated/authenticated VL and Access Policies in its wallet 440. The resolver 447 may then return to operation 610 to keep its wallet 440 loaded with current labels and/or access policies for the resources 409 that it controls MAC Verifiable Label Decision Service FIG. 6B is a flow chart showing one method 650 of operation for a MAC verifiable label decision service 448, consistent with some embodiments. The decision service 448, in some embodiments, may provide an interface to communicate with the OE MAC enforcement daemon and may respond to requests from the OE MAC enforcement daemon. The method 650 may begin at operation 655, with the decision service 558 retrieving VLs from the wallet 440 using OE MAC enforcement daemon-provided object ID's of the subject (406) and the object to which the subject is requesting access authorization. Next, at operation 660, the MAC verifiable label decision service 448 may compare attributes of Subject and Object to the MAC access policy. If the MAC access policy permits the action, then the MAC verifiable label decision service 448 may return an access authorization to the OE MAC enforcement daemon at operation 665; otherwise, the decision service 448 may decline to authorize the action and return an error code at operation 670.

MAC Enforcement

Figure 6C:
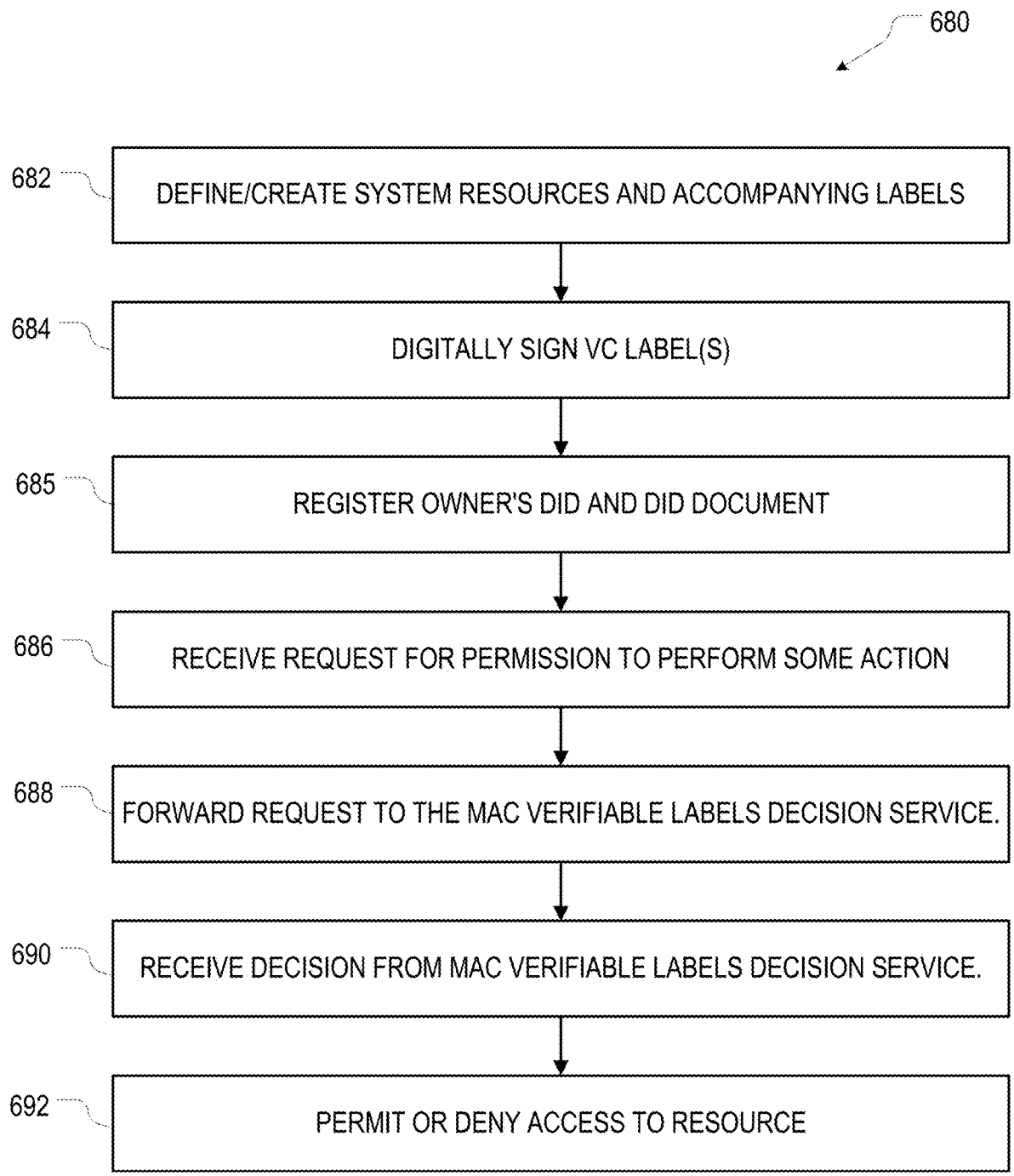
FIG. 6C is a flow chart illustrating one method for enforcing MAC controls, consistent with some embodiments.

FIG. 6C is a flow chart illustrating one method 680 for enforcing MAC controls, consistent with some embodiments. At operation 682, in out-of-band processes, system owners 402 and/or system administrators 408 may define/create system subjects (406) and resources 409 and accompanying verifiable labels (VLs) that identify attributes upon which authentication and access control decisions can be made. These labels may be files in the format of VCs and may conform to digitally signed schemas published to the identity network 410. At operation 684, a resource's 409 VL may be digitally signed by its owner. The resource owner may be identified by a DID 412 registered on an identity network 410. The system owner 402 may hold its own private keys, and may also register (at operation 685) its DID 412 and publish its corresponding DID document to the identity network 410 so any VCs it issues, and digitally signs, can be validated.

In one illustrative example, a data steward 408 has registered itself on an identity network 410 and has been issuing VLs for the data files for which it is responsible, and storing the VLs in an identity hub 430. An author of a batch process script 408 has also registered himself on an identity network 410 and issued a VL for this script file; a system owner 402 has registered himself on an identity network 410 and has issued a security access policy 436 for his OE 401 in the form of a VC. The security access policy 436, in turn, identifies the credential-based access control policy that will be enforced for MAC on the OE 401 (e.g., that a "sensitivity level" of a subject has to be greater or equal to the "sensitivity level" of the resource object. In this example, all of these issuers created VCs and VLs that conform with the schemas registered on the identity network 410.

Next, at operation 686, a requesting entity (e.g., a batch process) may request permission from the operating system of the OE 401 to perform some action (e.g., open a file, access a system resource, etc.) with respect to a specified object. In response, the OE MAC process daemon requests an access authorization decision from the decision service 448 at operation 688. The decision service 448 obtains the applicable MAC Label VCs from the OE's wallet 440 and compares their attributes to the security policy VC and returns an authorization decision to the OE MAC enforcement daemon at operation 690. At operation 692, the OE MAC enforcement daemon enforces the authorization decision by permitting or denying access by the subject to the requested object.

Blockchain Architecture

Figure 7A:
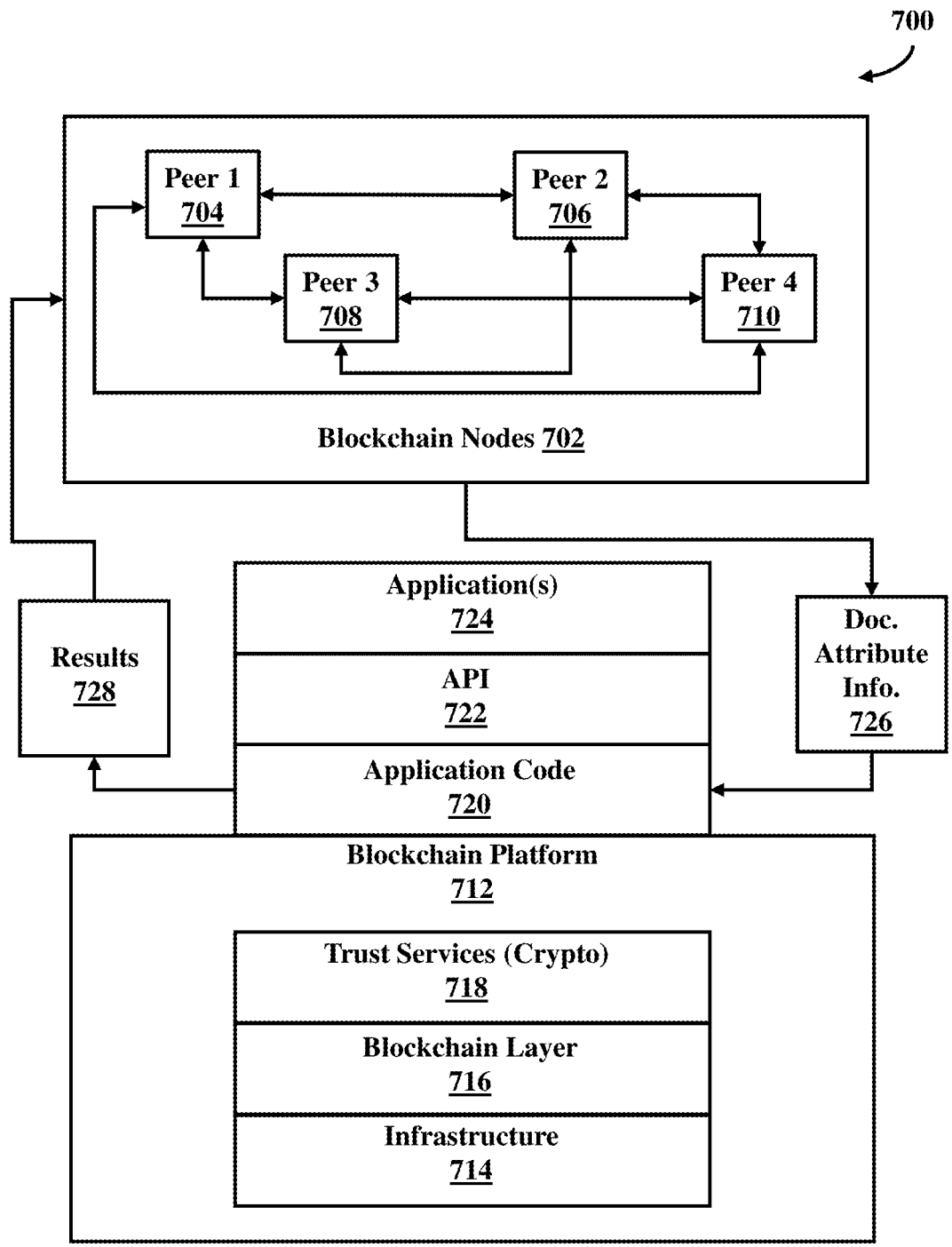
FIG. 7A depicts an example blockchain architecture configuration, consistent with some embodiments.

FIG. 7A illustrates a blockchain architecture configuration 700, consistent with some embodiments. The blockchain architecture 700 in these embodiments may include certain blockchain elements, for example, a group of blockchain nodes 702. The group of blockchain nodes 702, in turn, may include one or more member nodes 704-710 (these four nodes are depicted by example only). These member nodes 704-710 may participate in a number of activities, such as blockchain transaction addition and validation process (consensus). One or more of the member nodes 704-710 may endorse transactions based on endorsement policy and may provide an ordering service for all blockchain nodes in the architecture 700. A member node 704-710 may initiate a blockchain authentication and seek to write to a blockchain immutable ledger stored in blockchain layer 716, a copy of which may also be stored on the underpinning physical infrastructure 714.

The blockchain architecture 700 in some embodiments may include one or more applications 724, which are linked to application programming interfaces (APIs) 722 to access and execute stored program/application code 720 (e.g., chaincode, smart contracts, etc.). The stored program/application code 720, in turn, can be created according to a customized configuration sought by participants and can maintain its own state, control their own assets, and receive external information. The stored program/application code 720 can be deployed as a transaction and installed, via appending to the distributed ledger, on all blockchain nodes 704-710.

A blockchain base or platform 712 may include various layers of blockchain data, services (e.g., cryptographic trust services, virtual execution environment, etc.), and underpinning physical computer infrastructure that may be used to receive and store new transactions and provide access to auditors which are seeking to access data entries. A blockchain layer 716 may expose an interface that provides access to the virtual execution environment necessary to process the program code and engage a physical infrastructure 714. Cryptographic trust services 718 may be used to verify transactions such as asset exchange transactions and keep information private.

The blockchain architecture configuration of FIG. 7A may process and execute the program/application code 720 via one or more interfaces exposed, and services provided, by the blockchain platform 712. The program/application code 720 may control blockchain assets. For example, the code 720 can store and transfer data, and may be executed by member nodes 704-710 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, document attribute(s) information 726 may be processed by one or more processing entities (e.g., virtual machines) included in the blockchain layer 716. A result 728 may include a plurality of linked shared documents. The physical infrastructure 714 may be utilized to retrieve any of the data or information described herein.

In some embodiments, the smart contract may be created via a high-level application and programming language, and then written to a block in the blockchain. The smart contract may include executable code that is registered, stored, and/or replicated with a blockchain (e.g., distributed network of blockchain peers). A transaction is an execution of the smart contract code that can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols in some embodiments.

The smart contract may write data to the blockchain in the format of key-value pairs. In some embodiments, the smart contract code can also read the values stored in a blockchain and use them in application operations. The smart contract code in these embodiments can then write the output of various logic operations into the blockchain. The smart contract code, in some embodiments, may be used to create a temporary data structure in a virtual machine or other computing platforms. Data written to the blockchain in these embodiments may be public or may be encrypted and maintained as private. The temporary data that is used/generated by the smart contract may be held in memory by the supplied execution environment, and then may be deleted once the data needed for the blockchain is identified.

The chaincode in some embodiments may comprise a code interpretation of a smart contract, with additional features. In some embodiments, the chaincode may be implemented as program code deployed on a computing network, where it is executed and validated by chain validators together during a consensus process. The chaincode may receive a hash and may retrieve from the blockchain a hash associated with the data template created by the use of a previously stored feature extractor. If the hashes of the hash identifier and the hash created from the stored identifier template data match, then the chaincode may send an authorization key to the requested service. The chaincode may write to the blockchain data associated with the cryptographic details.

Figure 7B:
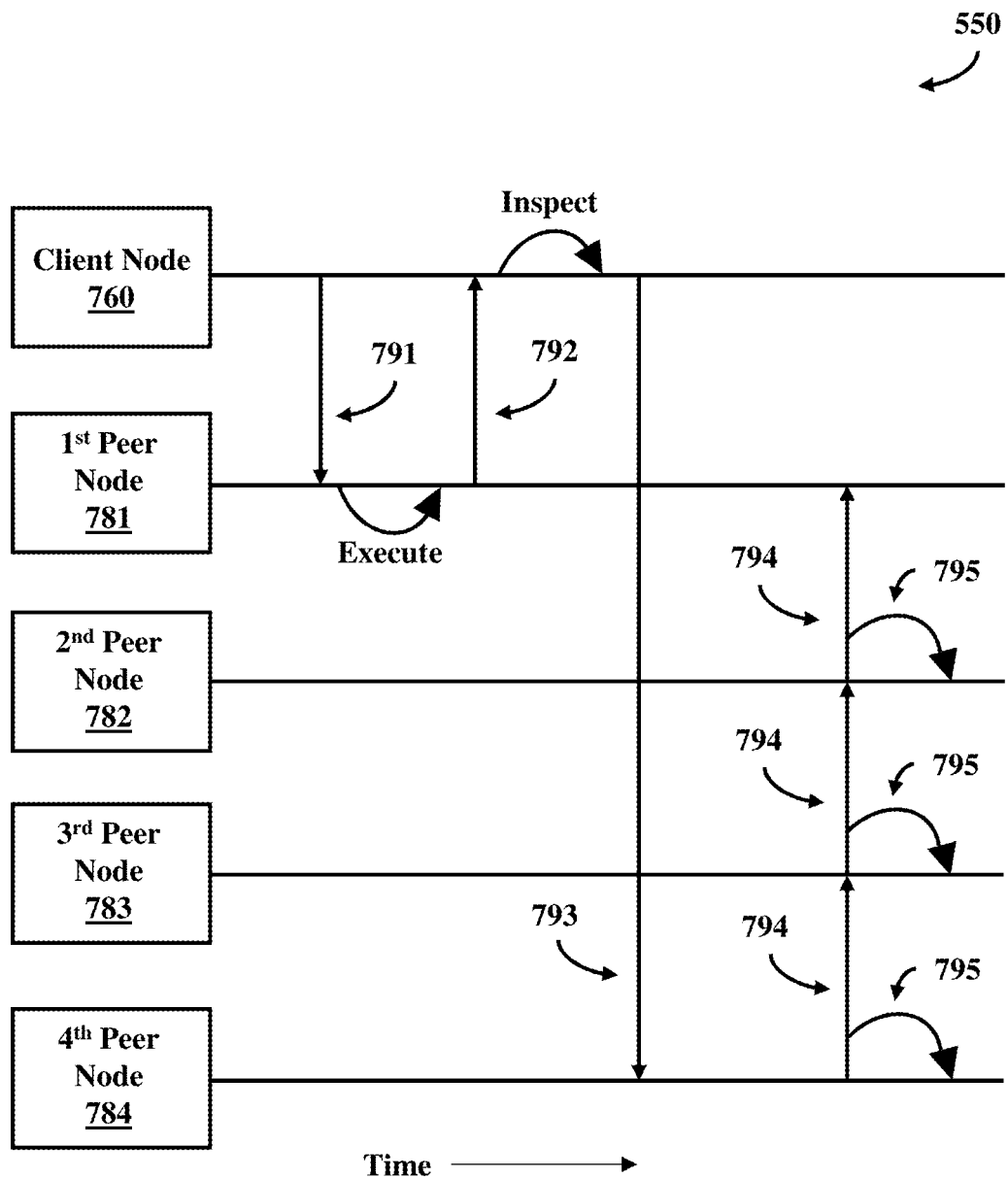
FIG. 7B illustrates a blockchain transactional flow, consistent with some embodiments.

FIG. 7B illustrates an example of a blockchain transactional flow 750 between nodes of the blockchain in accordance with some embodiments. The transaction flow in these embodiments may include a transaction proposal 791 sent by an application client node 760 to an endorsing peer node 781. The endorsing peer 781 may verify the client signature and execute a chaincode function to initiate the transaction. The output may include the chaincode results, a set of key/value versions that were read in the chaincode (read set), and the set of keys/values that were written in chaincode (write set). The proposal response 792 may then be sent back to the client 760, along with an endorsement signature, if approved.

In response, the client 760 may assemble the endorsements into a transaction payload 793 and broadcasts it to an ordering service node 784. The ordering service node 784 may then deliver ordered transactions as blocks to all peers 781-783 on a channel. Before committal to the blockchain, each peer 781-783 may validate the transaction. For example, the peers in some embodiments may check the endorsement policy to ensure that the correct allotment of the specified peers have signed the results and authenticated the signatures against the transaction payload 793.

With continuing reference to FIG. 7B, the client node 760 in some embodiments may initiate the transaction 791 by constructing and sending a request to the peer node 781, which may act an endorser. The client 760 may include an application leveraging a supported software development kit (SDK), which may utilize an available API to generate a transaction proposal. The transaction proposal, in turn, may be a request to invoke a chaincode function so that data can be read and/or written to the distributed ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 781 may verify: (a) that the transaction proposal is well-formed; (b) the transaction has not been submitted already in the past (replay-attack protection); (c) the signature is valid; and (d) that the submitter (client 760, in this example embodiment) is properly authorized to perform the proposed operation on that channel. The endorsing peer node 781 may take the transaction proposal inputs as arguments to the invoked chaincode function. The chaincode may then be executed against a current state database to produce transaction results, including a response value, read set, and write set. In some embodiments, no updates are made to the ledger at this point. Instead, the set of values, along with the endorsing peer node's 781 signature, may be passed back as a proposal response 792 to the SDK of the client 760, which parses the payload for the application to consume.

In response, the application of the client 760 may inspect/verify the endorsing peers' signatures and may compare the proposal responses to determine if the proposal response is the same. If the chaincode only queried the ledger, the application may inspect the query response and would typically not submit the transaction to the ordering node service 784. If the client application intends to submit the transaction to the ordering node service 784 to update the ledger, the application may determine if the specified endorsement policy has been fulfilled before submitting (i.e., did all peer nodes necessary for the transaction endorse the transaction). Here, the client may include only one of a multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After a successful inspection, in operation 793, the client 760 may assemble endorsements into a transaction and may broadcast the transaction proposal and response within a transaction message to the ordering node 784. The transaction may contain the read/write sets, the endorsing peers' signatures, and a channel ID. The ordering node 784 does not need to inspect the entire content of a transaction in order to perform its operation; instead the ordering node 784 may simply receive transactions from all channels in the network, order them chronologically by channel, and create blocks of transactions per channel.

The blocks of the transaction may be delivered from the ordering node 784 to all peer nodes 781-783 on the channel. The transactions 794 within the block may be validated to ensure any endorsement policy is fulfilled and to ensure that there have been no changes to ledger state for read set variables since the read set was generated by the transaction execution. Transactions in the block may be tagged as being valid or invalid. Furthermore, in operation 795, each peer node 781-783 may append the block to the channel's chain, and for each valid transaction, the write sets are committed to the current state database. An event may be emitted to notify the client application that the transaction (invocation) has been immutably appended to the chain, as well as to notify whether the transaction was validated or invalidated.

Permissioned Blockchains

Figure 8A:
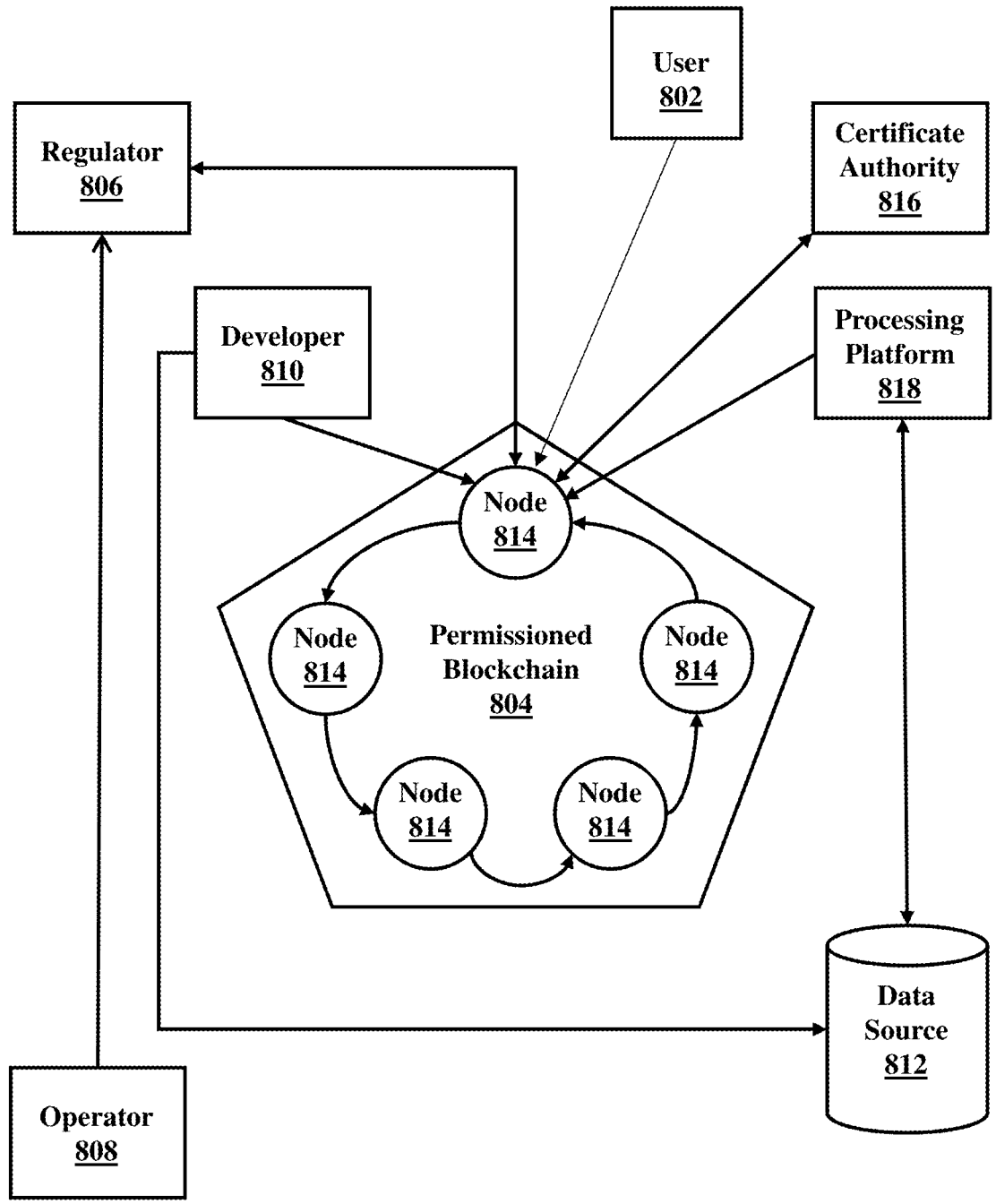
FIG. 8A illustrates a flow diagram, consistent with some embodiments.

FIG. 8A illustrates an example of a permissioned blockchain network, which features a distributed, decentralized peer-to-peer architecture, consistent with some embodiments. In this example, a blockchain user 802 may initiate a transaction to the permissioned blockchain 804. In this example, the transaction may be a deploy, invoke, or query, and may be issued through a client-side application leveraging an SDK, directly through an API, etc. Networks may provide access to a regulator 806, such as an auditor. A blockchain network operator 808 manages member permissions, such as enrolling the regulator 806 as an "auditor" and the blockchain user 802 as a "client." An auditor may be restricted only to querying the ledger, whereas a client may be authorized to deploy, invoke, and query certain types of chaincode.

A blockchain developer 810 can write chaincode and client-side applications in some embodiments. The blockchain developer 810 in these embodiments may deploy chaincode directly to the network through an interface. To include credentials from a traditional data source 812 in chaincode, the developer 810 may use an out-of-band connection to access the data. In this example, the blockchain user 802 may connect to the permissioned blockchain 804 through a peer node 814. Before proceeding with any transactions, the peer node 814 may retrieve the user's enrollment and transaction certificates from a certificate authority 816, which manages user roles and permissions. In some embodiments, blockchain users must possess these digital certificates in order to transact on the permissioned blockchain 804. In other embodiments, blockchain users may be authenticated using other techniques, such as via distributed chains of trust. Meanwhile, a user attempting to utilize chaincode may be required to verify their credentials on the traditional data source 812. Chaincode may use an out-of-band connection to this data through a traditional processing platform 818 to confirm the user's authorization.

Figure 8B:
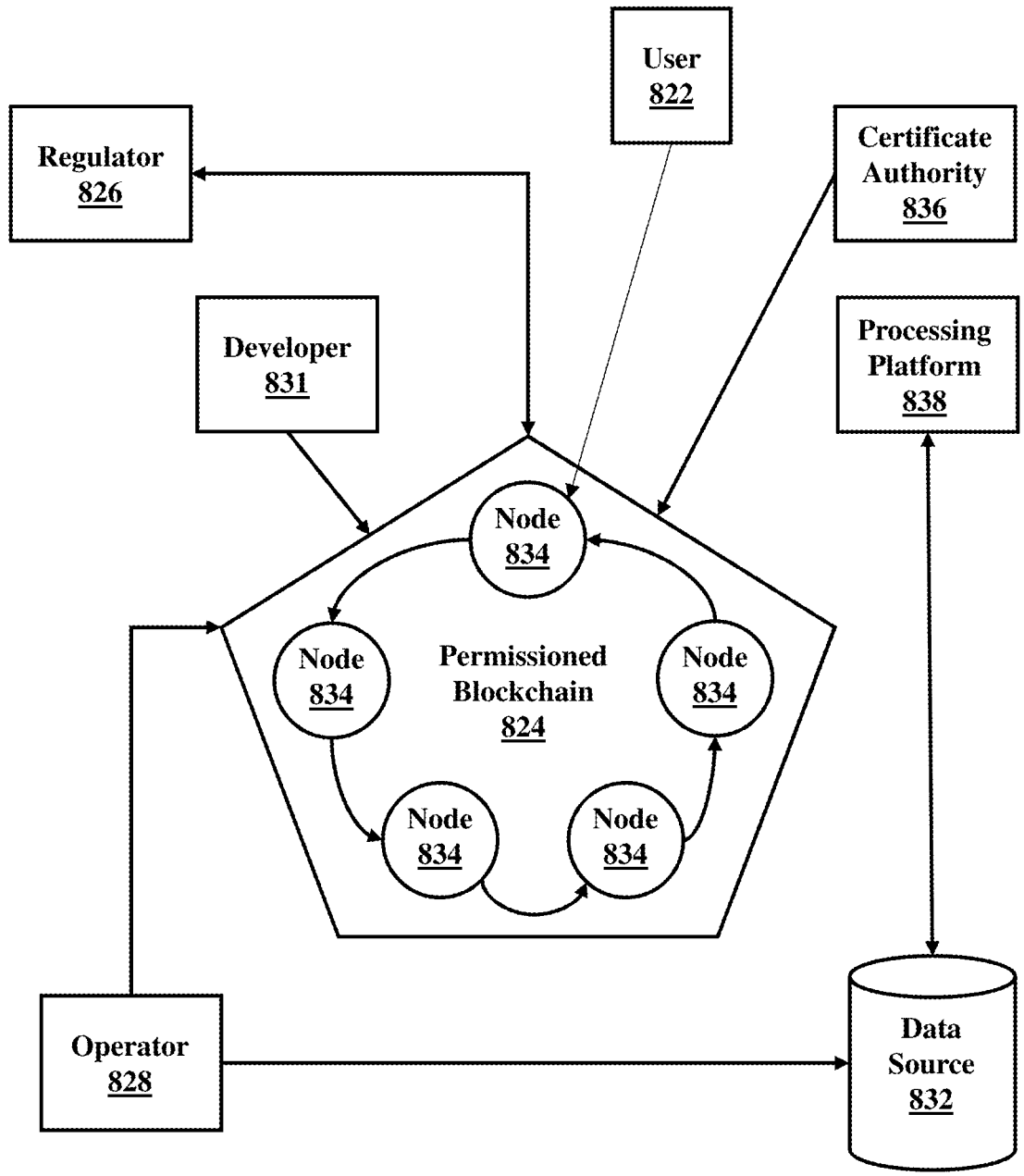
FIG. 8B illustrates a further flow diagram, consistent with some embodiments.

FIG. 8B illustrates another example of a permissioned blockchain network, which features a distributed, decentralized peer-to-peer architecture, consistent with some embodiments. In this example, a blockchain user 822 may submit a transaction to the permissioned blockchain 824. In this example, the transaction can be a deploy, invoke, or query, and may be issued through a client-side application leveraging an SDK, directly through an API, etc. Networks may provide access to a regulator 826, such as an auditor. A blockchain network operator 828 manages member permissions, such as enrolling the regulator 826 as an "auditor" and the blockchain user 822 as a "client." An auditor could be restricted only to querying the ledger, whereas a client could be authorized to deploy, invoke, and query certain types of chaincode.

A blockchain developer 831 in these embodiments may write chaincode and client-side applications. The blockchain developer 831 may deploy chaincode directly to the network through an interface. To include credentials from a traditional data source 832 in chaincode, the developer 831 may use an out-of-band connection to access the data. In this example, the blockchain user 822 connects to the network through a peer node 834. Before proceeding with any transactions, the peer node 834 retrieves the user's enrollment and transaction certificates from the certificate authority 836. In some embodiments, blockchain users must possess these digital certificates in order to transact on the permissioned blockchain 824. In other embodiments, blockchain users may be authenticated using other techniques, such as via distributed chains of trust. Meanwhile, a user attempting to utilize chaincode may be required to verify their credentials on the traditional data source 832. Chaincode can use an out-of-band connection to this data through a traditional processing platform 838 to confirm the user's authorization.

Figure 8C:
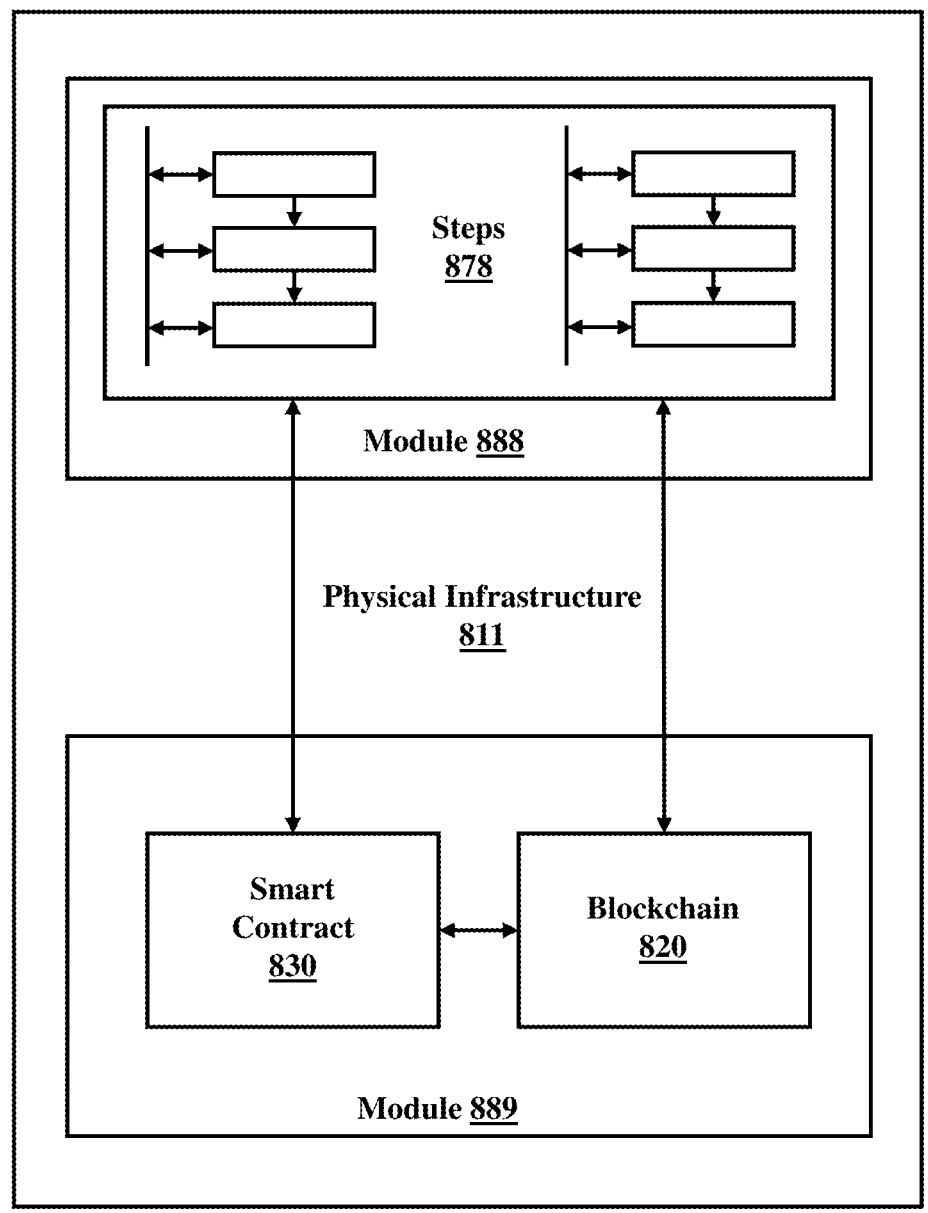
FIG. 8C illustrates an example system configured to perform one or more operations described herein, consistent with some embodiments.

FIG. 8C illustrates an example system that includes a physical infrastructure 811 configured to perform various operations, consistent with some embodiments. Referring to FIG. 6C, the physical infrastructure 811 includes a module 888 and a module 889. The module 819 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical infrastructure 811, the module 888, and the module 889 may include one or more computers, servers, processors, memories, and/or wireless communication devices. Further, the module 888 and the module 889 may be the same module.

Figure 8D:
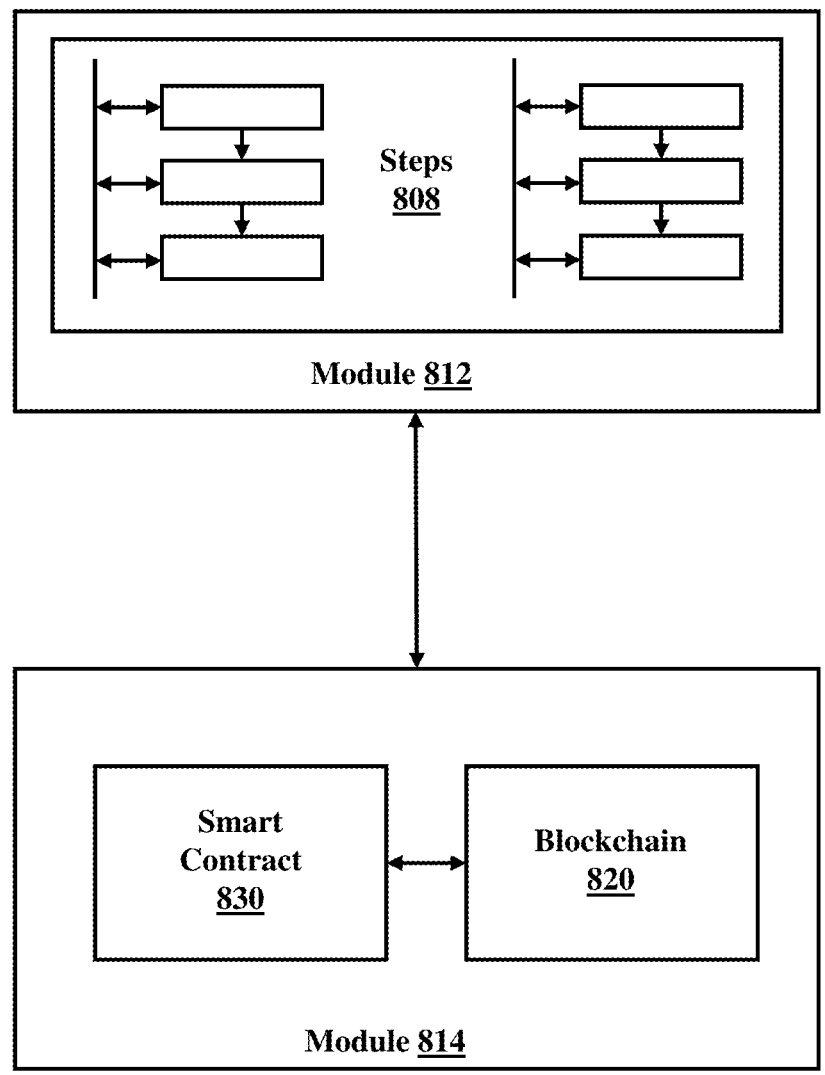
FIG. 8D illustrates another example system configured to perform one or more operations described herein, consistent with some embodiments.

FIG. 8D illustrates another example system configured to perform various operations, consistent with some embodiments. Referring to FIG. 6D, the system includes a module 812 and a module 814. The module 814 includes a blockchain 820 and a smart contract 830 (which may reside on the blockchain 820) that may execute any of the operational steps 878 (in module 812) included in any of the example embodiments. The steps/operations 878 may include one or more of the embodiments described or depicted and may represent output or written information that is written or read from one or more smart contracts 830 and/or blockchains 820. The physical module 812 and the module 814 may include one or more computers, servers, processors, memories, and/or wireless communication devices. Further, the module 812 and the module 814 may be the same module.

Figure 8E:
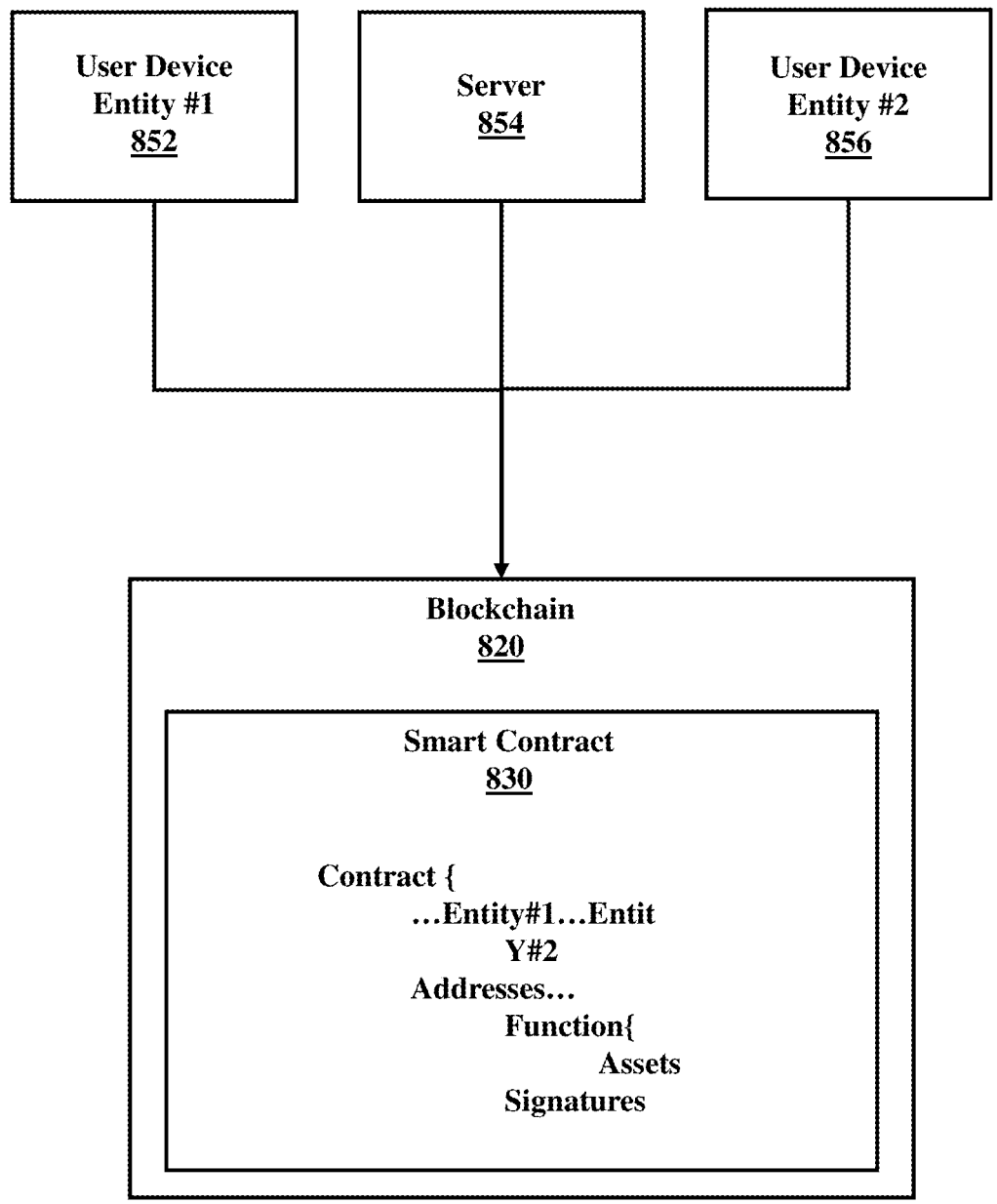
FIG. 8E illustrates a further example system configured to utilize a smart contract, consistent with some embodiments.

FIG. 8E illustrates an example system configured to utilize a smart contract configuration among contracting parties and a mediating server configured to enforce the smart contract terms on the blockchain 820, consistent with some embodiments. Referring to FIG. 6E, the configuration may represent a communication session, an asset transfer session, or a process or procedure that is driven by a smart contract 830, which explicitly identifies one or more user devices 852 and/or 856. The execution, operations, and results of the smart contract execution may be managed by a server 854. Content of the smart contract 830 may require digital signatures by one or more of the entities 852 and 856, which are parties to the smart contract transaction. The results of the smart contract execution may be written to a blockchain 820 as a blockchain transaction. The smart contract 830 resides on the blockchain 820, which may reside on one or more computers, servers, processors, memories, and/or wireless communication devices.

Figure 8F:
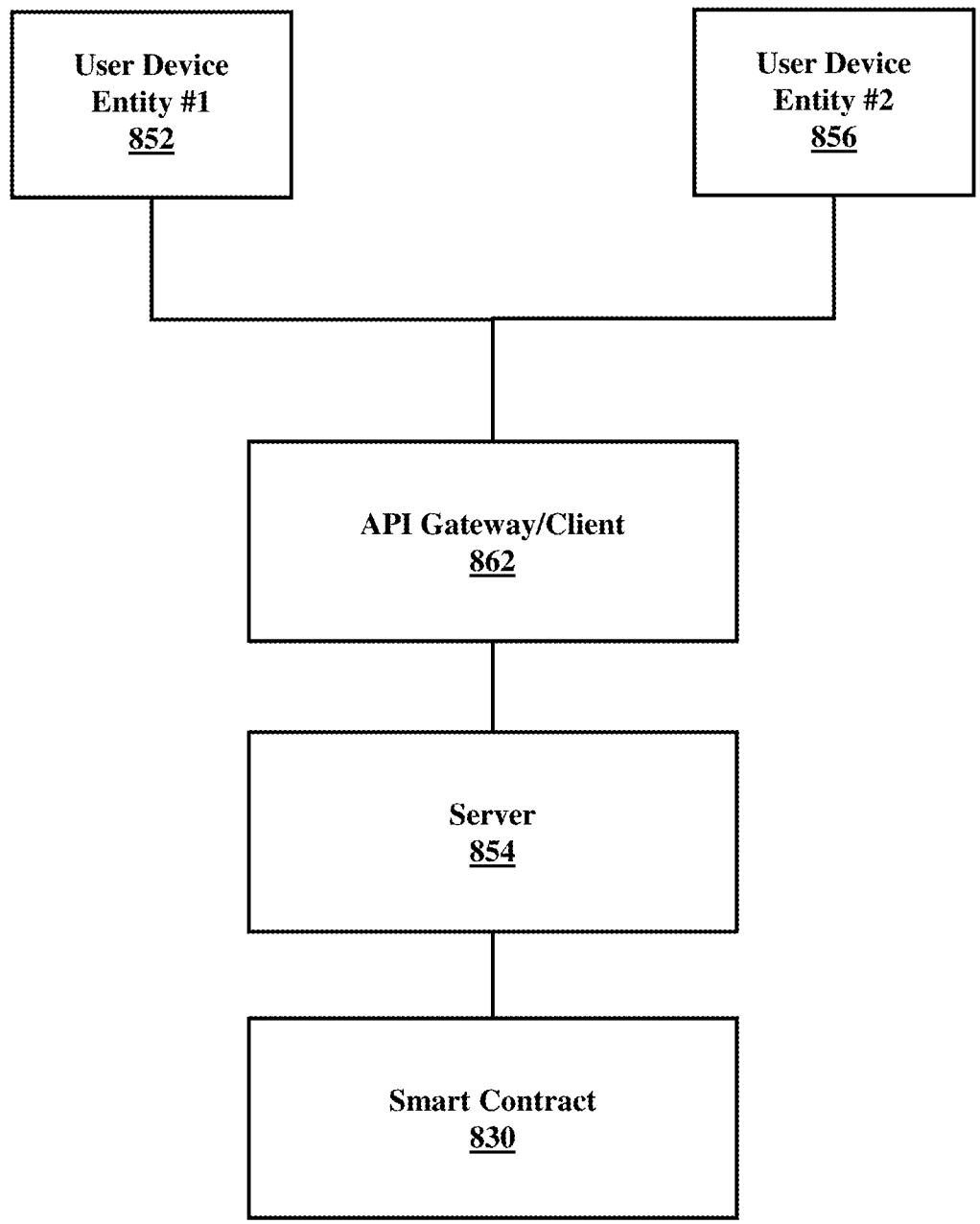
FIG. 8F illustrates a system including a blockchain, consistent with some embodiments.

FIG. 8F illustrates a system 860, including a blockchain, consistent with some embodiments. Referring to the example of FIG. 8D, an application programming interface (API) gateway 862 provides a common interface for accessing blockchain logic (e.g., smart contract 830 or other chaincode) and data (e.g., distributed ledger, etc.). In this example, the API gateway 862 is a common interface for performing transactions (invoke, queries, etc.) on the blockchain by connecting one or more entities 852 and 856 to a blockchain peer (i.e., server 854). Here, the server 854 is a blockchain network peer component that holds a copy of the world state and a distributed ledger allowing clients 852 and 856 to query data on the world stage as well as submit transactions into the blockchain network where depending on the smart contract 830 and endorsement policy, endorsing peers will run the smart contracts 830.

Block Processing

Figure 9A:
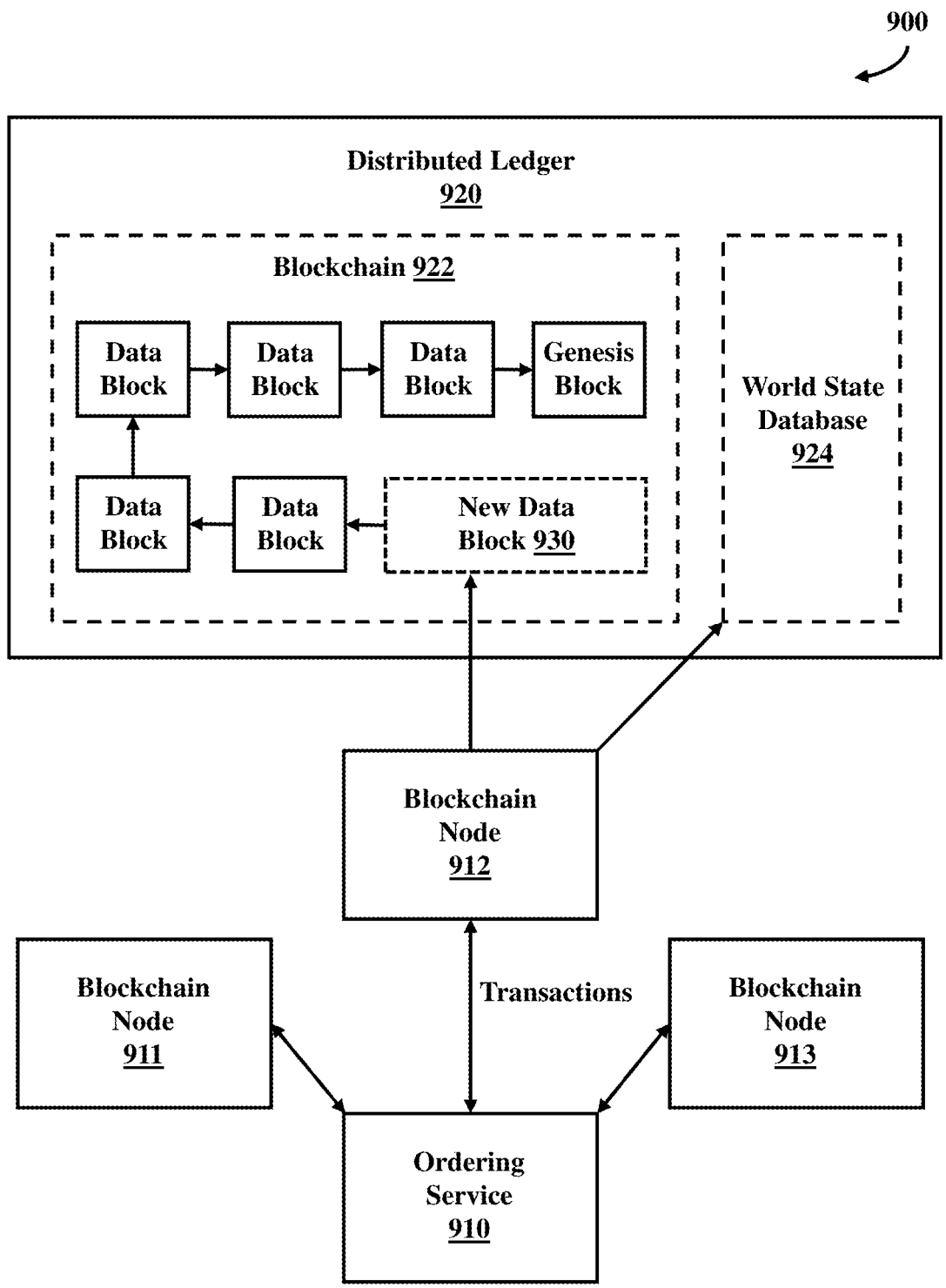
FIG. 9A illustrates a process for a new block being added to a distributed ledger, according to example embodiments.

FIG. 9A illustrates a process 900 of a new block being added to a distributed ledger 920, consistent with some embodiments, and FIG. 7B illustrates contents of a new data block structure 930 for blockchain, consistent with some embodiments. The new data block 930 may contain document linking data.

Referring to FIG. 9A, clients (not shown) may submit transactions to blockchain nodes 911, 912, and/or 913. Clients may be instructions received from any source to enact activity on the blockchain 922. As an example, clients may be applications that act on behalf of a requester, such as a device, person, or entity to propose transactions for the blockchain. The plurality of blockchain peers (e.g., blockchain nodes 911, 912, and 913) may maintain a state of the blockchain network and a copy of the distributed ledger 920. Different types of blockchain nodes/peers may be present in the blockchain network including endorsing peers which simulate and endorse transactions proposed by clients and committing peers which verify endorsements, validate transactions, and commit transactions to the distributed ledger 920. In some embodiments, the blockchain nodes 911, 912, and 913 may perform the role of endorser node, committer node, or both.

Figure 9B:
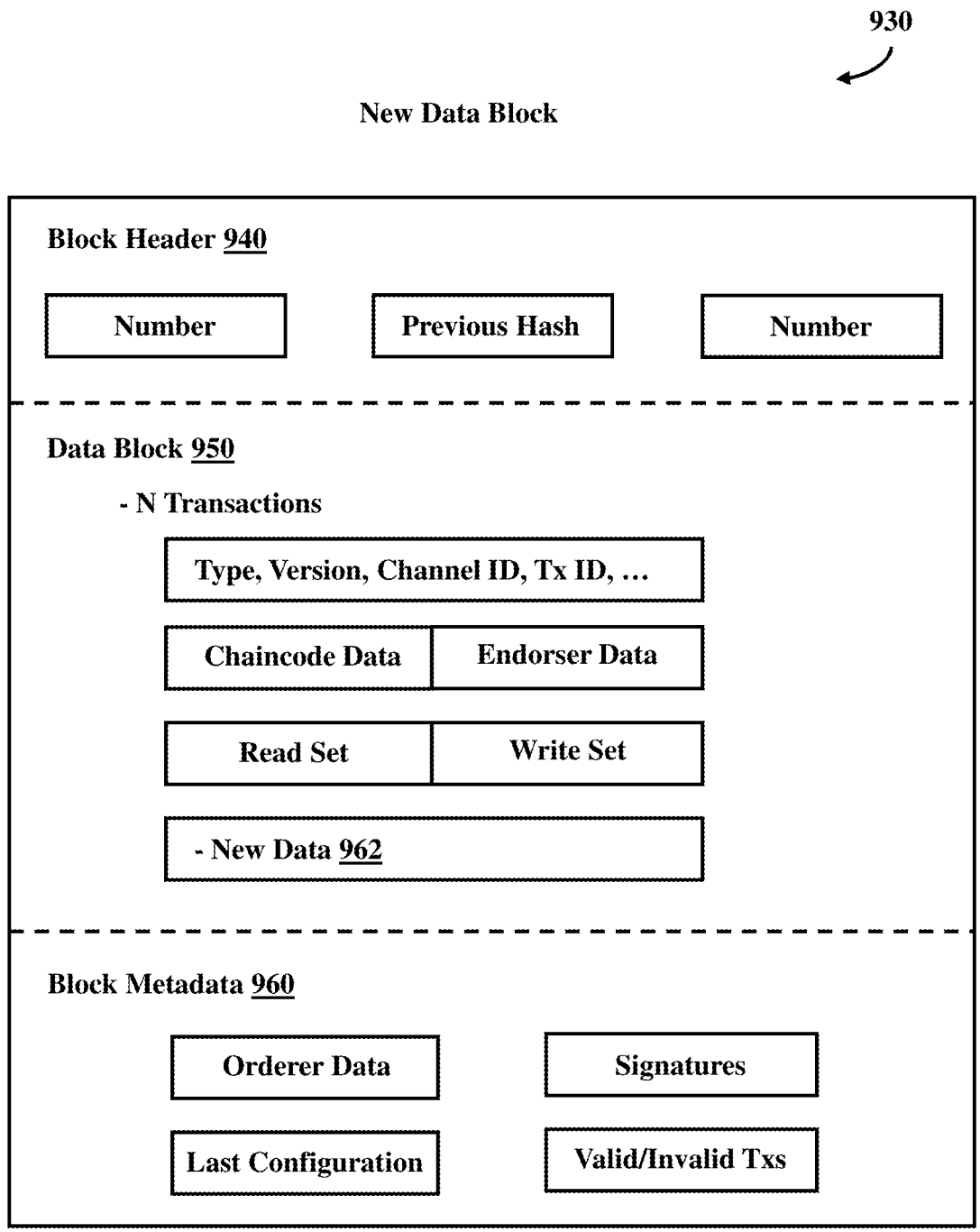
FIG. 9B illustrates contents of a new data block, according to example embodiments.

The distributed ledger 920 may include a blockchain which stores immutable, sequenced records in blocks, and a state database 924 (current world state) maintaining a current state of the blockchain 922. One distributed ledger 920 may exist per channel and each peer maintains its own copy of the distributed ledger 920 for each channel of which they are a member. The blockchain 922 may be a transaction log, structured as hash-linked blocks where each block contains a sequence of N transactions. Blocks may include various components such as shown in FIG. 9B. The linking of the blocks (shown by arrows in FIG. 9A) may be generated by adding a hash of a prior block's header within a block header of a current block. In this way, all transactions on the blockchain 922 may be sequenced and cryptographically linked together preventing tampering with blockchain data without breaking the hash links. Furthermore, because of the links, the latest block in the blockchain 922 represents every transaction that has come before it. The blockchain 922 may be stored on a peer file system (local or attached storage), which supports an append-only blockchain workload.

The current state of the blockchain 922 and the distributed ledger 920 may be stored in the state database 924. Here, the current state data represents the latest values for all keys ever included in the chain transaction log of the blockchain 922. Chaincode invocations execute transactions against the current state in the state database 924. To make these chaincode interactions more efficient, the latest values of all keys may be stored in the state database 924. The state database 924 may include an indexed view into the transaction log of the blockchain 922, it can therefore be regenerated from the chain at any time. The state database 924 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing node creates a transaction endorsement, which is a signed response from the endorsing node to the client application indicating the endorsement of the simulated transaction. The method of endorsing a transaction depends on an endorsement policy that may be specified within chaincode. An example of an endorsement policy is "the majority of endorsing peers must endorse the transaction." Different channels may have different endorsement policies. Endorsed transactions are forward by the client application to ordering service 910.

The ordering service 910 accepts endorsed transactions, orders them into a block, and delivers the blocks to the committing peers. For example, the ordering service 910 may initiate a new block when a threshold of transactions has been reached, a timer times out, or another condition. In the example of FIG. 9A, blockchain node 912 is a committing peer that has received a new data new data block 930 for storage on blockchain 922. The first block in the blockchain may be referred to as a genesis block, which includes information about the blockchain, its members, the data stored therein, etc.

The ordering service 910 may be made up of a cluster of orderers. The ordering service 910 in some embodiments may not process transactions, smart contracts, or maintain the shared ledger. Rather, the ordering service 910 in these embodiments may accept the endorsed transactions and specify the order in which those transactions are committed to the distributed ledger 920. The architecture of the blockchain network may be designed such that the specific implementation of "ordering" (e.g., Solo, Kafka, BFT, etc.) becomes a pluggable component.

Transactions in some embodiments may be written to the distributed ledger 920 in a consistent order. The order of transactions in these embodiments may be established to ensure that the updates to the state database 924 are valid when they are committed to the network. Unlike a cryptocurrency blockchain system (e.g., Bitcoin, etc.), where ordering occurs through the solving of a cryptographic puzzle, or mining, in this example the parties of the distributed ledger 920 may choose the ordering mechanism that best suits that network.

In some embodiments, when the ordering service 910 initializes a new data block 930, the new data block 930 may be broadcast to committing peers (e.g., blockchain nodes 911, 912, and 913). In response, each committing peer may validate the transaction within the new data block 930 by checking to make sure that the read set and the write set still match the current world state in the state database 924. Specifically, the committing peer may determine whether the read data that existed when the endorsers simulated the transaction is identical to the current world state in the state database 924. When the committing peer validates the transaction, the transaction may be written to the blockchain 922 on the distributed ledger 920, and the state database 924 may be updated with the write data from the read-write set. In some embodiments, if a transaction fails (e.g., if the committing peer finds that the read-write set does not match the current world state in the state database 924), the transaction ordered into a block may still be included in that block, but marked as invalid, and the state database 924 not updated.

Referring to FIG. 9B, a new data block 930 (also referred to as a data block) that is stored on the blockchain 922 of the distributed ledger 920 may include multiple data segments such as a block header 940, block data 950, and block metadata 960. It should be appreciated that the various depicted blocks and their contents, such as new data block 930 and its contents, shown in FIG. 9B are merely examples and are not meant to limit the scope of the example embodiments. The new data block 930 may store transactional information of N transaction(s) (e.g., 1, 10, 100, 200, 1000, 2000, 3000, etc.) within the block data 950. The new data block 930 may also include a link to a previous block (e.g., on the blockchain 922 in FIG. 9A) within the block header 940. In particular, the block header 940 may include a hash of a previous block's header. The block header 940 may also include a unique block number, a hash of the block data 950 of the new data block 930, and the like. The block number of the new data block 930 may be unique and assigned in various orders, such as an incremental/sequential order starting from zero.

The block data 950 may store transactional information of each transaction that is recorded within the new data block 930. For example, the transaction data may include one or more of: a type of the transaction, a version, a timestamp, a channel ID of the distributed ledger 920, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 950 may also store new data 962, which adds additional information to the hash-linked chain of blocks in the blockchain 922. The additional information may include one or more of the steps, features, processes and/or actions described or depicted herein. Accordingly, the new data 962 may be stored in an immutable log of blocks on the distributed ledger 920. Some of the benefits of storing such new data 962 are reflected in the various embodiments disclosed and depicted herein. Although in FIG. 9B the new data 962 is depicted in the block data 950, it could also be located in the block header 940 or the block metadata 960 in some embodiments. The new data 962 may also include a document composite key that is used for linking the documents within an organization.

The block metadata 960 may store multiple fields of metadata (e.g., as a byte array, etc.). Metadata fields may include: signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 910. Meanwhile, a committer of the block (such as blockchain node 912) may add validity/invalidity information based on an endorsement policy, verification of read/write sets, and the like. The transaction filter may include a byte array of a size equal to the number of transactions in the block data 950 and a validation code identifying whether a transaction was valid/invalid.

Figure 9C:
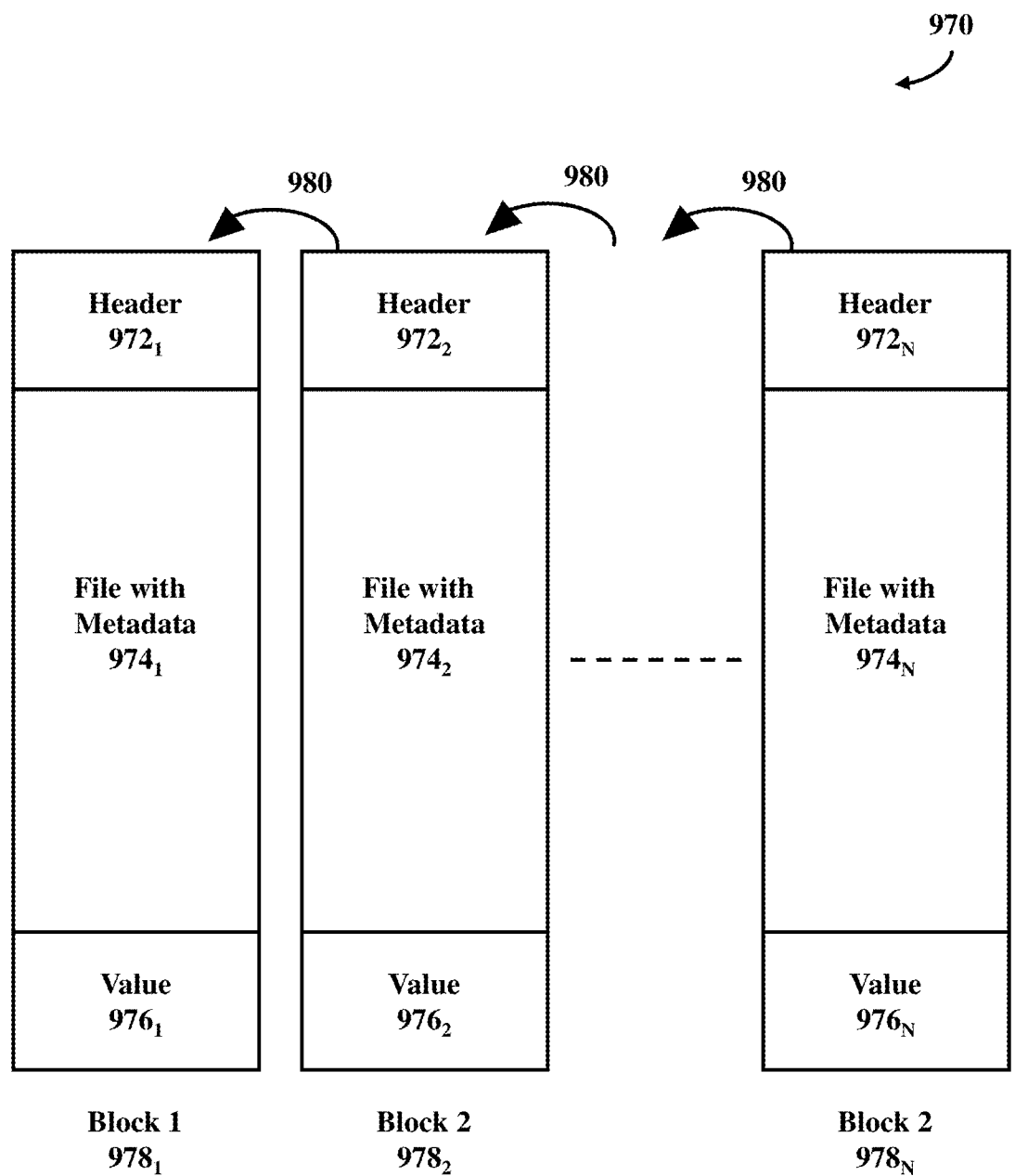
FIG. 9C illustrates a blockchain for digital content, according to example embodiments.

FIG. 9C illustrates an embodiment of a blockchain 970 for digital content, consistent with some embodiments. The digital content may include one or more files and associated information. The files may include transaction data, media, images, video, audio, text, links, graphics, animations, web pages, documents, or other forms of digital content. The immutable, append-only aspects of some blockchain embodiments may be desirable to serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain in these embodiments may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may not be included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value ... Content |
| . | . |
| . | . |
| . | . |
| Block N Hash Value | Block N Hash Value ... Content |

In the example embodiment of FIG. 7C, the blockchain 970 includes a number of blocks $978_1$, $978_2$, ... $978_N$ cryptographically linked in an ordered sequence, where N≥1. The encryption used to link the blocks $978_1$, $978_2$, ... $978_N$ may be any of a number of keyed or un-keyed Hash functions. In one embodiment, the blocks $978_1$, $978_2$, ... $978_N$ are subject to a hash function that produces n-bit alphanumeric outputs (where n is 256 or another number) from inputs that are based on information in the blocks. Examples of such a hash function include, but are not limited to: an SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $978_1$, $978_2$, ... , $978_N$ may be cryptographically linked by a function that is different from a hash function. For purposes of illustration, the following description is made with reference to a hash function, e.g., SHA-2.

Each of the blocks $978_1$, $978_2$, ..., $978_N$ in the blockchain may include a header, a version of the file, and a value. The header and the value may be different for each block as a result of hashing in the blockchain. In one embodiment, the value may be included in the header. As described in greater detail below, the version of the file may be the original file or may be a different version of the original file.

The first block $978_1$ in the blockchain is referred to as the genesis block and may include the header $972_1$, original file $974_1$, and an initial value $976_1$. The hashing scheme used for the genesis block, and indeed in all subsequent blocks, may vary. For example, all the information in the first block $978_1$ may be hashed together and at one time, or each or a portion of the information in the first block $978_1$ may be separately hashed, and then a hash of the separately hashed portions may be performed.

The header $972_1$ may include one or more initial parameters, which, for example, may include a version number, timestamp, nonce, root information, difficulty level, consensus protocol, duration, media format, source, descriptive keywords, and/or other information associated with original file $974_1$ and/or the blockchain. The header $972_1$ may be generated automatically (e.g., by blockchain network managing software) or manually by a blockchain participant. Unlike the header in other blocks $978_2$ to $978_N$ in the blockchain, the header $972_1$ in the genesis block may not reference a previous block, simply because there is no previous block.

The original file $974_1$ in the genesis block may be, for example, data as captured by a device with or without processing prior to its inclusion in the blockchain. The original file $974_1$ may be received through the interface of the system from the device, media source, or node. The original file $974_1$ may be associated with metadata, which, for example, may be generated by a user, the device, and/or the system processor, either manually or automatically. The metadata may be included in the first block $978_1$ in association with the original file $974_1$.

The value $976_1$ in the genesis block may be an initial value generated based on one or more unique attributes of the original file $974_1$. In one embodiment, the one or more unique attributes may include the hash value for the original file $974_1$, metadata for the original file $974_1$, and other information associated with the file. In one implementation, the initial value $976_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $978_2$ to $978_N$ in the blockchain also have headers, files, and values. However, unlike the header $972_1$ of the first block, each of the headers $972_2$ to $972_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 980, to establish an auditable and immutable chain-of-custody.

Each of the header $972_2$ to $972_N$ in the other blocks may also include other information, e.g., version number, timestamp, nonce, root information, difficulty level, consensus protocol, and/or other parameters or information associated with the corresponding files and/or the blockchain in general.

The files $974_2$ to $974_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing, which involves analyzing a file, may include, for example, appending, including, or otherwise associating various analytics, statistics, or other information associated with the file.

The values in each of the other blocks $976_2$ to $976_N$ in the other blocks are unique values and are all different as a result of the processing performed. For example, the value in any one block corresponds to an updated version of the value in the previous block. The update is reflected in the hash of the block to which the value is assigned. The values of the blocks, therefore, provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block, including the redacted file, will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

In one embodiment, the value of a previous block may be updated (e.g., a new hash value computed) to form the value of a current block when any one or more of the following occurs. The new hash value may be computed by hashing all or a portion of the information noted below, in this example embodiment:

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 9D illustrates an embodiment of a block, which may represent the structure of the blocks in the blockchain 990, consistent with some embodiments. The block, Block$_i$, may include a header $972_i$, a file $974_i$, and a value $976_i$.

The header 972i may include a hash value of a previous block Block$_{i-1}$ and additional reference information, which, for example, may be any of the types of information (e.g., header information including references, characteristics, parameters, etc.) discussed herein. All blocks in some embodiments may reference the hash of a previous block except the genesis block in some embodiments. The hash value of the previous block may be just a hash of the header in the previous block or a hash of all or a portion of the information in the previous block, including the file and metadata.

The file $974_i$ may include a plurality of data, such as Data 1, Data 2, . . . , Data N in sequence. The data are tagged with Metadata 1, Metadata 2, . . . , Metadata N, which describe the content and/or characteristics associated with the data. For example, the metadata for each data may include: information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference REF1, REF2, . . . , REFN to a previous data to prevent tampering, gaps in the file, and sequential reference through the file.

Once the metadata is assigned to the data (e.g., through a smart contract), the metadata cannot be altered without the hash changing in some embodiments, which can easily be identified for invalidation. The metadata in these embodiments, thus, creates a data log of information that may be accessed for use by participants in the blockchain.

The value $976_i$ in some embodiments may be a hash value or other value computed based on any of the types of information previously discussed. For example, for any given block Block$_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 970 is formed, at any point in time, the immutable chain-of-custody for the file may be obtained by querying the blockchain for the transaction history of the values across the blocks in some embodiments. This query, or tracking procedure, may begin with decrypting the value of the block that is most currently included (e.g., the last (Nth) block), and then continuing to decrypt the value of the other blocks until the genesis block is reached and the original file is recovered. The decryption may involve decrypting the headers and files and associated metadata at each block, as well.

Decryption may be performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key may be associated with each other through some mathematical relationship. The public key may be distributed publicly to serve as an address to receive messages from other users, e.g., an IP address or home address. The private key may be kept secret and may be used to digitally sign messages sent to other blockchain participants. The signature, in turn, may be included in the message so that the recipient can verify using the public key of the sender. This way, the recipient can be confident that only the sender could have sent this message.

In some embodiments, generating a key pair may be analogous to creating an account on the blockchain, but without having to actually register anywhere. In these embodiments, every transaction that is executed on the blockchain may be digitally signed by the sender using their private key. This signature may help ensure that only the owner of the account can track and process (if within the scope of permission determined by a smart contract) the file of the blockchain.

Computer Program Product

Although the present invention has been described in detail with reference to certain examples thereof, it may also be embodied in other specific forms without departing from the essential spirit or attributes thereof. For example, the present invention may be a system, a method, and/or a computer program product at any possible technical detail level of integration. The computer program product may include a computer-readable storage medium (or media) having computer readable program instructions thereon for causing a processor to carry out aspects of the present invention. The computer-readable program instructions can be stored and executed on a single computer or divided amongst different computers, at the same location or different locations, for storage and execution.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the customer's computer, partly on the customer's computer, as a stand-alone software package, partly on the customer's computer and partly on a remote computer or entirely on the remote computer or server. In the latter scenario, the remote computer may be connected to the customer's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

General

Aspects of the present invention were described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. Moreover, the flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program," "application," "server," or other meaningful nomenclature. Indeed, other alternative hardware and/or software environments may be used without departing from the scope of the invention.

Therefore, it is desired that the embodiments described herein be considered in all respects as illustrative, not restrictive, and that reference be made to the appended claims for determining the scope of the invention.

What is claimed is:

1. A computer-implemented method for using decentralized verifiable credential as mandatory access control (MAC) labels, comprising:
    receiving, from an entity, a first verifiable MAC label associated with an object to which access is controlled;
    receiving, from the entity, a second verifiable MAC label associated with a subject requesting to access the object; and
    determining whether to grant, to the subject, access to the object responsive to the request based on comparing the first verifiable MAC label associated with the object and the second verifiable MAC label associated with the subject to a verifiable MAC policy;
    wherein each of the first verifiable MAC label, the second verifiable MAC label, and the verifiable MAC policy are formatted as a verifiable credential that is machine readable and digitally signed, and wherein the verifiable credential comprises one or more globally unique Decentralized Identifiers (DIDs) based on Uniform Resource Identifiers (URI).

2. The computer-implemented method of claim 1, further comprising registering a globally unique decentralized identifier (DID) and a DID document associated with the entity in a distributed ledger, wherein the DID document identifies authentication mechanisms and communication endpoints relating to the entity.

3. The computer-implemented method of claim 2, wherein:
    the entity is chosen from the group consisting of an operating environment, a system administrator, the subject, a resource steward, an author, and an owner of the operating environment;
    the object is chosen from the group consisting of a file and a resource; and
    the subject is chosen from the group consisting of a process, a thread, and a human user.

4. The computer-implemented method of claim 2, wherein the authentication mechanism comprises a public key.

5. The computer-implemented method of claim 2, wherein an operating system of a data processing system associated with the subject and object determines whether to grant, to the subject, access to the object.

6. The computer-implemented method of claim 2, further comprising an out-of-band process registering the first verifiable MAC label, the second verifiable MAC label, and the verifiable MAC policy in a credential repository.

7. The computer-implemented method of claim 6, further comprising:
    an operating environment periodically receiving new verifiable credentials from the credential repository;
    validating the new verifiable credentials; and
    storing the validated credentials in a wallet.

8. The computer-implemented method of claim 7, further comprising:
    retrieving, by the operating environment, validated credentials associated with the subject and the object from the wallet;
    comparing attributes of the subject, the object, and a MAC access policy; and
    authorizing access by the subject to the object based on the comparison.

9. The computer-implemented method of claim 2, further comprising creating one or more schemas, schema-compliant verifiable MAC labels, and verifiable MAC policies.

10. The computer-implemented method of claim 9, further comprising:
    creating the DID document associated with an operating environment of a data processing system; and
    registering, by an operating environment agent, the DID document associated with the operating environment in the distributed ledger.

11. A computer program product for using decentralized verifiable credential as mandatory access control (MAC) labels, the computer program product comprising a computer readable storage medium having program instructions embodied therewith, the program instructions executable by a processor to cause the processor to:
    receive, from an entity, a first verifiable MAC label associated with an object to which access is controlled;
    receive, from the entity, a second verifiable MAC label associated with a subject requesting to access the object;
    determine whether to grant, to the subject, access to the object responsive to the request based on comparing the first verifiable MAC label associated with the object and the second verifiable MAC label associated with the subject to a verifiable MAC policy; and wherein each of the first verifiable MAC label, the second verifiable MAC label, and the verifiable MAC policy is formatted as a verifiable credential that is machine readable and digitally signed, and wherein the verifiable credential comprises one or more globally unique Decentralized Identifiers (DIDs) based on Uniform Resource Identifiers (URI).

12. The computer program product of claim 11, further comprising program instructions to register a globally unique decentralized identifier (DID) and DID document associated with the entity in a distributed ledger, wherein the DID document identifies authentication mechanisms and communication endpoints associated with the entity.

13. The computer program product of claim 11, further comprising program instructions to register the first verifiable MAC label, the second verifiable MAC label, and the verifiable MAC policy in a repository.

14. The computer program product of claim 13, further comprising program instructions to:
periodically receive new verifiable credentials from a credential repository;
validate the new verifiable credentials;
store the validated credentials in a wallet;
receive, from the subject, the request to access the object;
retrieve validated credentials associated with the subject and the object from the wallet;
compare attributes of the subject, the object, and the MAC access policy; and
authorize access by the subject to the object based on the comparison.

15. A data processing system, comprising: a processor coupled to a memory; and an operating environment (OE) agent for the data processing system, wherein the OE agent is configured to use decentralized verifiable credential as mandatory access control (MAC) labels, including:
receiving, from an entity, a first verifiable MAC label associated with an object to which access is controlled by the OE agent;
receiving, from the entity, a second verifiable MAC label associated with a subject; receiving, from the subject, a request to access the object;
determining whether to grant, to the subject, access to the object responsive to the request based on comparing the first verifiable MAC label associated with the object and the second verifiable MAC label associated with the subject to a verifiable MAC policy; and
wherein each of the first verifiable MAC label, the second verifiable MAC label, and the verifiable MAC policy is formatted as a verifiable credential that is machine readable and digitally signed, and wherein the verifiable credential comprises one or more globally unique Decentralized Identifiers (DIDs) based on Uniform Resource Identifiers (URI).

16. The data processing system of claim 15, wherein the OE agent is further configured to register a globally unique decentralized identifier (DID) and DID document associated in a distributed ledger, wherein the DID document identifies an authentication mechanism, a communication endpoint, and a controller associated with the entity.

17. The data processing system of claim 16, wherein the OE agent is further configured to receive the first verifiable MAC label, the second verifiable MAC label, and the verifiable MAC policy from a repository.

18. The data processing system of claim 17, wherein the agent is further configured to:
periodically receive new verifiable credentials from a credential repository;
validate the new verifiable credentials;
store the validated credentials in a wallet;
retrieve validated credentials associated with the subject and the object from the wallet; compare attributes of the subject, the object, and the verifiable MAC policy; and
authorize access by the subject to the object based on the comparison.

19. The data processing system of claim 18, wherein:
the entity is chosen from the group consisting of: the subject, a resource steward, an author, a system administrator for the data processing system, and an owner of the data processing system;
the object is chosen from the group consisting of a file on the data processing system or a resource in the data processing system; and
the subject is chosen from the group consisting of a process on the data processing system, a thread on the data processing system, and a human user of the data processing system.

20. A computer-implemented method for operating a verifiable mandatory access control (MAC) system, comprising:
defining verifiable MAC labels for resources to which access is controlled by a data processing system;
issuing verifiable credentials for the verifiable MAC labels,
wherein the verifiable MAC labels are formatted as the verifiable credentials, and wherein the verifiable credentials comprise one or more globally unique Decentralized Identifiers (DIDs) based on Uniform Resource Identifiers (URI);
storing the verifiable credentials in a wallet on the data processing system;
periodically receiving new verifiable credentials from a credential repository;
validating the new verifiable credentials;
storing the new validated credentials in the wallet; and
wherein the verified credentials and the new verified credentials are machine readable and digitally signed.

21. The computer-implemented method of claim 20, further comprising
receiving, from a subject, a request to access an object;
retrieving, from the wallet, a first verifiable MAC label associated with the object;
retrieving, from the wallet, a second verifiable MAC label associated with the subject; and
determining whether to grant, to the subject, access to the object responsive to the request based on comparing the first verifiable MAC label associated with the object and a second verifiable MAC label associated with the subject to a verifiable MAC policy.

22. The computer-implemented method of claim 21, further comprising:
registering a schema of the verifiable credentials in a distributed ledger; and
registering a globally unique decentralized identifier (DID) and DID document associated with the data processing system in the distributed ledger,
wherein the DID document identifies authentication mechanisms, communication endpoints for the data processing system, and its controller.

23. The computer-implemented method of claim 21, wherein:
the object is chosen from the group consisting of a file or a resource; and
the subject is chosen from the group consisting of a process, thread, and a human user.

24. A mandatory access control system, comprising:
a peer node associated with a blockchain network,
the blockchain network comprising a plurality of nodes,
the peer node adapted to record a plurality of globally unique Decentralized Identifiers (DIDs) for a mandatory access control system;
a plurality of first verifiable MAC labels associated with a respective plurality of objects to which access is controlled; and
a plurality of a second verifiable MAC labels associated with a respective plurality of subjects requesting to access the plurality of objects
wherein each of the plurality of first verifiable MAC labels and the plurality of second verifiable MAC labels is formatted as a verifiable credential that is machine readable and digitally signed, and wherein the verifiable credential comprises one or more of the globally unique DIDs based on Uniform Resource Identifiers (URI).

25. The mandatory access control system of claim 24, wherein the peer node is further adapted to
register a globally unique decentralized identifier (DID) and DID document associated with the plurality of objects and the plurality of subjects in a distributed ledger,
wherein the DID document identifies authentication mechanisms and communication endpoints associated with the entity.

* * * * *